(12) United States Patent
Moran et al.

(10) Patent No.: US 10,445,763 B2
(45) Date of Patent: Oct. 15, 2019

(54) AUTOMATED PROMOTION FORECASTING AND METHODS THEREFOR

(71) Applicant: EVERSIGHT, INC., Palo Alto, CA (US)

(72) Inventors: David Moran, Palo Alto, CA (US); Michael Montero, Palo Alto, CA (US)

(73) Assignee: EVERSIGHT, INC., Palo Alto, CA (US)

( * ) Notice: Subject to any disclaimer, the term of this patent is extended or adjusted under 35 U.S.C. 154(b) by 0 days.

(21) Appl. No.: 14/231,460

(22) Filed: Mar. 31, 2014

(65) Prior Publication Data

US 2014/0330636 A1 Nov. 6, 2014

Related U.S. Application Data

(63) Continuation-in-part of application No. 14/209,851, filed on Mar. 13, 2014, now Pat. No. 9,984,387.

(60) Provisional application No. 61/780,630, filed on Mar. 13, 2013.

(51) Int. Cl.
*G06Q 30/00* (2012.01)
*G06Q 30/02* (2012.01)
*G06F 3/042* (2006.01)
*G06T 1/00* (2006.01)
*G06T 3/00* (2006.01)

(52) U.S. Cl.
CPC ....... *G06Q 30/0244* (2013.01); *G06F 3/0425* (2013.01); *G06Q 30/02* (2013.01); *G06Q 30/0269* (2013.01); *G06Q 30/0277* (2013.01); *G06T 1/0021* (2013.01); *G06T 3/0006* (2013.01)

(58) Field of Classification Search
CPC . G06Q 30/0277; G06Q 30/0269; G06Q 30/02
See application file for complete search history.

(56) References Cited

U.S. PATENT DOCUMENTS

| | | | | |
|---|---|---|---|---|
| 6,577,982 B1 * | 6/2003 | Erb | ...................... | G06F 11/3684 702/120 |
| 7,158,959 B1 | 1/2007 | Chickering et al. | | |
| 7,200,527 B1 | 4/2007 | Davidov et al. | | |
| 7,639,727 B1 * | 12/2009 | Brisebois | ............... | H04B 1/713 375/134 |
| 8,606,626 B1 * | 12/2013 | DeSoto | .................. | G06Q 30/00 709/204 |
| 8,972,391 B1 * | 3/2015 | McDonnell | ............. | H04L 67/10 707/727 |

(Continued)

OTHER PUBLICATIONS

Pradip Kumar Bala; A Data Model for Investigating the Impact of Promotion in Retailing; 2009 IEEE (IACC 2009); p. 670-674; 2009.*

(Continued)

*Primary Examiner* — Radu Andrei
(74) *Attorney, Agent, or Firm* — King S. Lim

(57) ABSTRACT

Methods and apparatus for implementing forward looking optimizing promotions by administering, in large numbers and iteratively, test promotions formulated using highly granular test variables on purposefully segmented subpopulations. The plurality of test promotions are automatically proposed. The responses from individuals in the subpopulations are received and analyzed. The analysis result is employed to subsequently formulate a general public promotion.

14 Claims, 14 Drawing Sheets

(56) References Cited

U.S. PATENT DOCUMENTS

| | | | |
|---|---|---|---|
| 2001/0018665 A1* | 8/2001 | Sullivan | G06Q 20/20 705/14.65 |
| 2002/0023117 A1 | 2/2002 | Bernardin et al. | |
| 2002/0087453 A1* | 7/2002 | Nicolaisen | G06Q 30/06 705/37 |
| 2002/0161641 A1 | 10/2002 | Quinlan et al. | |
| 2002/0169700 A1 | 11/2002 | Huffman et al. | |
| 2003/0130580 A1 | 7/2003 | Kenyon | |
| 2003/0149938 A1* | 8/2003 | McElfresh | G06Q 30/02 715/251 |
| 2003/0204437 A1 | 10/2003 | Flender et al. | |
| 2004/0093542 A1 | 5/2004 | Isodono et al. | |
| 2004/0123247 A1 | 6/2004 | Wachen et al. | |
| 2004/0133457 A1 | 7/2004 | Sadiq et al. | |
| 2004/0148211 A1* | 7/2004 | Honarvar | G06Q 10/063 705/7.11 |
| 2004/0223648 A1* | 11/2004 | Hoene | G06F 17/2211 382/218 |
| 2005/0096963 A1* | 5/2005 | Myr | G06Q 10/06375 705/7.35 |
| 2005/0189415 A1* | 9/2005 | Fano | G06N 20/00 235/383 |
| 2005/0246206 A1 | 11/2005 | Obora et al. | |
| 2005/0273376 A1* | 12/2005 | Ouimet | G06Q 10/04 705/7.31 |
| 2006/0167917 A1* | 7/2006 | Solomon | G05B 19/418 |
| 2006/0259835 A1 | 11/2006 | Marinissen et al. | |
| 2006/0271671 A1* | 11/2006 | Hansen | G06Q 30/02 709/224 |
| 2008/0021909 A1 | 1/2008 | Black et al. | |
| 2008/0033808 A1 | 2/2008 | Black et al. | |
| 2008/0189156 A1 | 8/2008 | Voda et al. | |
| 2008/0306830 A1* | 12/2008 | Lasa | G06Q 30/02 705/14.16 |
| 2009/0017913 A1 | 1/2009 | Bell et al. | |
| 2009/0030785 A1* | 1/2009 | Goyal | G06Q 30/00 705/14.1 |
| 2009/0282343 A1 | 11/2009 | Catlin et al. | |
| 2009/0292588 A1* | 11/2009 | Duzevik | G06N 3/126 705/7.29 |
| 2009/0292771 A1 | 11/2009 | Bertoni et al. | |
| 2009/0313109 A1* | 12/2009 | Bous | G06Q 30/02 705/14.31 |
| 2010/0153332 A1 | 6/2010 | Rollins et al. | |
| 2010/0179855 A1* | 7/2010 | Chen | G06Q 10/063 705/7.31 |
| 2010/0250714 A1* | 9/2010 | Wehmann | G06Q 30/02 709/220 |
| 2010/0274661 A1* | 10/2010 | Aaltonen | G06Q 30/02 705/14.42 |
| 2011/0035379 A1* | 2/2011 | Chen | G06F 16/2462 707/740 |
| 2011/0040756 A1* | 2/2011 | Jones | G06F 16/951 707/737 |
| 2011/0045831 A1 | 2/2011 | Chiu et al. | |
| 2011/0119155 A1 | 5/2011 | Hammad et al. | |
| 2011/0161113 A1 | 6/2011 | Rumak et al. | |
| 2011/0173055 A1 | 7/2011 | Ross et al. | |
| 2011/0246994 A1* | 10/2011 | Kimbrel | G06F 9/5027 718/102 |
| 2011/0258049 A1 | 10/2011 | Ramer et al. | |
| 2011/0295722 A1* | 12/2011 | Reisman | G06Q 30/0201 705/27.1 |
| 2011/0313835 A1* | 12/2011 | Falkenborg | G06Q 30/0224 705/14.25 |
| 2012/0158099 A1 | 6/2012 | Lee | |
| 2012/0264089 A1* | 10/2012 | Hoang | G09B 5/00 434/107 |
| 2012/0310990 A1* | 12/2012 | Viegas | G06F 16/44 707/794 |
| 2013/0030868 A1* | 1/2013 | Lyon | G06Q 30/0236 705/7.33 |
| 2013/0073388 A1 | 3/2013 | Heath | |
| 2013/0091019 A1* | 4/2013 | Mallon | G06Q 30/0251 705/14.68 |
| 2013/0110880 A1 | 5/2013 | Farchi et al. | |
| 2013/0138812 A1 | 5/2013 | Assuncao et al. | |
| 2013/0151332 A1* | 6/2013 | Yan | G06Q 30/0243 705/14.42 |
| 2013/0185147 A1 | 7/2013 | Letca et al. | |
| 2013/0254151 A1* | 9/2013 | Mohagheghi | G06Q 30/0621 706/46 |
| 2013/0331999 A1 | 12/2013 | Vaughn et al. | |
| 2013/0346302 A1 | 12/2013 | Purves et al. | |
| 2014/0006129 A1* | 1/2014 | Heath | G06Q 30/0222 705/14.23 |
| 2014/0025391 A1* | 1/2014 | Knowles | G06Q 30/0222 705/2 |
| 2014/0046757 A1 | 2/2014 | Kahn et al. | |
| 2014/0046872 A1* | 2/2014 | Arnott | G06Q 40/06 705/36 R |
| 2014/0081741 A1 | 3/2014 | Katsur | |
| 2014/0095611 A1* | 4/2014 | Weinstein | H04W 4/21 709/204 |
| 2014/0136537 A1* | 5/2014 | Nelson | G06Q 30/00 707/737 |
| 2014/0180790 A1* | 6/2014 | Boal | G06Q 30/0245 705/14.42 |
| 2014/0278786 A1 | 9/2014 | Liu-Qiu-Yan | |
| 2014/0278798 A1* | 9/2014 | Goyal | G06Q 30/0204 705/7.33 |
| 2014/0337120 A1 | 11/2014 | Ercanbrack | |
| 2015/0019325 A1* | 1/2015 | Li | G06Q 30/02 705/14.42 |
| 2015/0049924 A1* | 2/2015 | Tang | G06T 11/60 382/118 |
| 2015/0050970 A1* | 2/2015 | Racho | G07F 17/3244 463/6 |
| 2015/0117631 A1* | 4/2015 | Tuchman | H04W 4/21 379/265.09 |
| 2015/0150023 A1* | 5/2015 | Johnson | G06F 9/5027 718/107 |
| 2016/0155193 A1* | 6/2016 | Merrill | G06Q 40/025 705/38 |
| 2016/0162931 A1* | 6/2016 | Hank | G06F 16/68 705/14.45 |
| 2017/0249664 A1* | 8/2017 | Hank | G06F 16/68 |

OTHER PUBLICATIONS

Jeff Lindsay; The Historic Use of Computerized Tools for Marketing and Market Research; 2001; Kimberley-Clark Corp; p. 32-52; 2001.*

* cited by examiner

AUTOMATED PROMOTION FORECASTING AND METHODS THEREFOR

PRIORITY CLAIM

The present invention is a continuation-in-part of a commonly owned US patent application entitled "Architecture and Methods for Promotion Optimization," U.S. application Ser. No. 14/209,851, filed in the USPTO on Mar. 13, 2014, by inventor Moran, which claims priority under 35 U.S.C. 119(e) to a commonly owned US provisional patent application entitled "Architecture and Methods for Promotion Optimization," U.S. Application No. 61/780,630, filed in the USPTO on Mar. 13, 2013, by inventor Moran, all of which is incorporated herein by reference.

RELATED APPLICATIONS

The present invention is related to the following applications, all of which are incorporated herein by reference:

Commonly owned application entitled "Adaptive Experimentation and Optimization in Automated Promotional Testing," application Ser. No. 14/231,426, filed Mar. 31, 2014 in the USPTO by Moran et al.

Commonly owned application entitled "Automated and Optimal Promotional Experimental Test Designs Incorporating Constraints," application Ser. No. 14/231,432, filed Mar. 31, 2014 in the USPTO by Moran et al.

Commonly owned application entitled "Automatic Offer Generation Using Concept Generator Apparatus and Methods Therefor," application Ser. No. 14/231,440, filed Mar. 31, 2014 in the USPTO by Moran et al.

Commonly owned application entitled "Automated Event Correlation to Improve Promotional Testing," application Ser. No. 14/231,442, filed Mar. 31, 2014 in the USPTO by Moran et al.

Commonly owned application entitled "Automated Behavioral Economics Patterns in Promotion Testing and Methods Therefor," application Ser. No. 14/231,555, filed Mar. 31, 2014 in the USPTO by Moran et al.

BACKGROUND OF THE INVENTION

The present invention relates to promotion optimization methods and apparatus therefor. More particularly, the present invention relates to computer-implemented methods and computer-implemented apparatus for optimizing promotions.

Promotion refers to various practices designed to increase sales of a particular product or services and/or the profit associated with such sales. Generally speaking, the public often associates promotion with the sale of consumer goods and services, including consumer packaged goods (e.g., food, home and personal care), consumer durables (e.g., consumer appliances, consumer electronics, automotive leasing), consumer services (e.g., retail financial services, health care, insurance, home repair, beauty and personal care), and travel and hospitality (e.g., hotels, airline flights, and restaurants). Promotion is particularly heavily involved in the sale of consumer packaged goods (i.e., consumer goods packaged for sale to an end consumer). However, promotion occurs in almost any industry that offers goods or services to a buyer (whether the buyer is an end consumer or an intermediate entity between the producer and the end consumer).

The term promotion may refer to, for example, providing discounts (using for example a physical or electronic coupon or code) designed to, for example, promote the sales volume of a particular product or service. One aspect of promotion may also refer to the bundling of goods or services to create a more desirable selling unit such that sales volume may be improved. Another aspect of promotion may also refer to the merchandising design (with respect to looks, weight, design, color, etc.) or displaying of a particular product with a view to increasing its sales volume. It includes calls to action or marketing claims used in-store, on marketing collaterals, or on the package to drive demand. Promotions may be composed of all or some of the following: price based claims, secondary displays or aisle end-caps in a retail store, shelf signage, temporary packaging, placement in a retailer circular/flyer/coupon book, a colored price tag, advertising claims, or other special incentives intended to drive consideration and purchase behavior. These examples are meant to be illustrative and not limiting.

In discussing various embodiments of the present invention, the sale of consumer packaged goods (hereinafter "CPG") is employed to facilitate discussion and ease of understanding. It should be kept in mind, however, that the promotion optimization methods and apparatuses discussed herein may apply to any industry in which promotion has been employed in the past or may be employed in the future.

Further, price discount is employed as an example to explain the promotion methods and apparatuses herein. It should be understood, however, that promotion optimization may be employed to manipulate factors other than price discount in order to influence the sales volume. An example of such other factors may include the call to action on a display or on the packaging, the size of the CPG item, the manner in which the item is displayed or promoted or advertised either in the store or in media, etc.

Generally speaking, it has been estimated that, on average, 17% of the revenue in the consumer packaged goods (CPG) industry is spent to fund various types of promotions, including discounts, designed to entice consumers to try and/or to purchase the packaged goods. In a typical example, the retailer (such as a grocery store) may offer a discount online or via a print circular to consumers. The promotion may be specifically targeted to an individual consumer (based on, for example, that consumer's demographics or past buying behavior). The discount may alternatively be broadly offered to the general public. Examples of promotions offered to general public include for example, a printed or electronic redeemable discount (e.g., coupon or code) for a specific CPG item. Another promotion example may include, for example, general advertising of the reduced price of a CPG item in a particular geographic area. Another promotion example may include in-store marking down of a particular CPG item only for a loyalty card user base.

In an example, if the consumer redeems the coupon or electronic code, the consumer is entitled to a reduced price for the CPG item. The revenue loss to the retailer due to the redeemed discount may be reimbursed, wholly or partly, by the manufacturer of the CPG item in a separate transaction.

Because promotion is expensive (in terms of, for example, the effort to conduct a promotion campaign and/or the per-unit revenue loss to the retailer/manufacturer when the consumer decides to take advantage of the discount), efforts are continually made to minimize promotion cost while maximizing the return on promotion dollars investment. This effort is known in the industry as promotion optimization.

For example, a typical promotion optimization method may involve examining the sales volume of a particular CPG item over time (e.g., weeks). The sales volume may be represented by a demand curve as a function of time, for example. A demand curve lift (excess over baseline) or dip (below baseline) for a particular time period would be examined to understand why the sales volume for that CPG item increases or decreases during such time period.

FIG. 1 shows an example demand curve 102 for Brand X cookies over some period of time. Two lifts 110 and 114 and one dip 112 in demand curve 102 are shown in the example of FIG. 1. Lift 110 shows that the demand for Brand X cookies exceeds the baseline at least during week 2. By examining the promotion effort that was undertaken at that time (e.g., in the vicinity of weeks 1-4 or week 2) for Brand X cookies, marketers have in the past attempted to judge the effectiveness of the promotion effort on the sales volume. If the sales volume is deemed to have been caused by the promotion effort and delivers certain financial performance metrics, that promotion effort is deemed to have been successful and may be replicated in the future in an attempt to increase the sales volume. On the other hand, dip 112 is examined in an attempt to understand why the demand falls off during that time (e.g., weeks 3 and 4 in FIG. 1). If the decrease in demand was due to the promotion in week 2 (also known as consumer pantry loading or retailer forward-buying, depending on whether the sales volume shown reflects the sales to consumers or the sales to retailers), this decrease in weeks 3 and 4 should be counted against the effectiveness of week 2.

One problem with the approach employed in the prior art has been the fact that the prior art approach is a backward-looking approach based on aggregate historical data. In other words, the prior art approach attempts to ascertain the nature and extent of the relationship between the promotion and the sales volume by examining aggregate data collected in the past. The use of historical data, while having some disadvantages (which are discussed later herein below), is not necessarily a problem. However, when such data is in the form of aggregate data (such as in simple terms of sales volume of Brand X cookies versus time for a particular store or geographic area), it is impossible to extract from such aggregate historical data all of the other factors that may more logically explain a particular lift or dip in the demand curve.

To elaborate, current promotion optimization approaches tend to evaluate sales lifts or dips as a function of four main factors: discount depth (e.g., how much was the discount on the CPG item), discount duration (e.g., how long did the promotion campaign last), timing (e.g., whether there was any special holidays or event or weather involved), and promotion type (e.g., whether the promotion was a price discount only, whether Brand X cookies were displayed/not displayed prominently, whether Brand X cookies were features/not featured in the promotion literature).

However, there may exist other factors that contribute to the sales lift or dip, and such factors are often not discoverable by examining, in a backward-looking manner, the historical aggregate sales volume data for Brand X cookies. This is because there is not enough information in the aggregate sales volume data to enable the extraction of information pertaining to unanticipated or seemingly unrelated events that may have happened during the sales lifts and dips and may have actually contributed to the sales lifts and dips.

Suppose, for example, that there was a discount promotion for Brand X cookies during the time when lift 110 in the demand curve 102 happens. However, during the same time, there was a breakdown in the distribution chain of Brand Y cookies, a competitor's cookies brand which many consumers view to be an equivalent substitute for Brand X cookies. With Brand Y cookies being in short supply in the store, many consumers bought Brand X instead for convenience sake. Aggregate historical sales volume data for Brand X cookies, when examined after the fact in isolation by Brand X marketing department thousands of miles away, would not uncover that fact. As a result, Brand X marketers may make the mistaken assumption that the costly promotion effort of Brand X cookies was solely responsible for the sales lift and should be continued, despite the fact that it was an unrelated event that contributed to most of the lift in the sales volume of Brand X cookies.

As another example, suppose, for example, that milk produced by a particular unrelated vendor was heavily promoted in the same grocery store or in a different grocery store nearby during the week that Brand X cookies experienced the sales lift 110. The milk may have been highlighted in the weekly circular, placed in a highly visible location in the store and/or a milk industry expert may have been present in the store to push buyers to purchase milk, for example. Many consumers ended up buying milk because of this effort whereas some of most of those consumers who bought during the milk promotion may have waited another week or so until they finished consuming the milk they bought in the previous weeks. Further, many of those milk-buying consumers during this period also purchased cookies out of an ingrained milk-and-cookies habit. Aggregate historical sales volume data for Brand X cookies would not uncover that fact unless the person analyzing the historical aggregate sales volume data for Brand X cookies happened to be present in the store during that week and had the insight to note that milk was heavily promoted that week and also the insight that increased milk buying may have an influence on the sales volume of Brand X cookies.

Software may try to take these unanticipated events into account but unless every SKU (stock keeping unit) in that store and in stores within commuting distance and all events, whether seemingly related or unrelated to the sales of Brand X cookies, are modeled, it is impossible to eliminate data noise from the backward-looking analysis based on aggregate historical sales data.

Even without the presence of unanticipated factors, a marketing person working for Brand X may be interested in knowing whether the relatively modest sales lift 114 comes from purchases made by regular Brand X cookies buyers or by new buyers being enticed by some aspect of the promotion campaign to buy Brand X cookies for the first time. If Brand X marketer can ascertain that most of the lift in sales during the promotion period that spans lift 114 comes from new consumers of Brand X cookies, such marketer may be willing to spend more money on the same type of sales promotion, even to the point of tolerating a negative ROI (return on investment) on his promotion dollars for this particular type of promotion since the recruitment of new buyers to a brand is deemed more much valuable to the company in the long run than the temporary increase in sales to existing Brand X buyers. Again, aggregate historical sales volume data for Brand X cookies, when examined in a backward-looking manner, would not provide such information.

Furthermore, even if all unrelated and related events and factors can be modeled, the fact that the approach is backward-looking means that there is no way to validate the hypothesis about the effect an event has on the sales volume since the event has already occurred in the past. With respect to the example involving the effect of milk promotion on Brand X cookies sales, there is no way to test the theory short of duplicating the milk shortage problem again. Even if the milk shortage problem could be duplicated again for testing purposes, other conditions have changed, including the fact that most consumers who bought milk during that period would not need to or be in a position to buy milk again in a long time. Some factors, such as weather, cannot be duplicated, making theory verification challenging.

Attempts have been made to employ non-aggregate sales data in promoting products. For example, some companies may employ a loyalty card program (such as the type commonly used in grocery stores or drug stores) to keep track of purchases by individual consumers. If an individual consumer has been buying sugar-free cereal, for example, the manufacturer of a new type of whole grain cereal may wish to offer a discount to that particular consumer to entice that consumer to try out the new whole grain cereal based on the theory that people who bought sugar-free cereal tend to be more health conscious and thus more likely to purchase whole grain cereal than the general cereal-consuming public. Such individualized discount may take the form of, for example, a redeemable discount such as a coupon or a discount code mailed or emailed to that individual.

Some companies may vary the approach by, for example, ascertaining the items purchased by the consumer at the point of sale terminal and offering a redeemable code on the purchase receipt. Irrespective of the approach taken, the utilization of non-aggregate sales data has typically resulted in individualized offers, and has not been processed or integrated in any meaningful sense into a promotion optimization effort to determine the most cost-efficient, highest-return manner to promote a particular CPG item to the general public.

Attempts have also been made to obtain from the consumers themselves indications of future buying behavior instead of relying on a backward-looking approach. For example, conjoint studies, one of the stated preference methods, have been attempted in which consumers are asked to state preferences. In an example conjoint study, a consumer may be approached at the store and asked a series of questions designed to uncover the consumer's future shopping behavior when presented with different promotions. Questions may be asked include, for example, "do you prefer Brand X or Brand Y" or "do you spend less than $100 or more than $100 weekly on grocery" or "do you prefer chocolate cookies or oatmeal cookies" or "do you prefer a 50-cent-off coupon or a 2-for-1 deal on cookies". The consumer may state his preference on each of the questions posed (thus making this study a conjoint study on stated preference).

However, such conjoint studies have proven to be an expensive way to obtain non-historical data. If the conjoint studies are presented via a computer, most users may ignore the questions and/or refuse to participate. If human field personnel are employed to talk to individual consumers to conduct the conjoint study, the cost of such studies tends to be quite high due to salary cost of the human field personnel and may make the extensive use of such conjoint studies impractical.

Further and more importantly, it has been known that conjoint studies are somewhat unreliable in gauging actual purchasing behavior by consumers in the future. An individual may state out of guilt and the knowledge that he needs to lose weight that he will not purchase any cookies in the next six months, irrespective of discounts. In actuality, that individual may pick up a package of cookies every week if such package is carried in a certain small size that is less guilt-inducing and/or if the package of cookies is promi-nently displayed next to the milk refrigerator and/or if a 10% off discount coupon is available. If a promotion effort is based on such flawed stated preference data, discounts may be inefficiently deployed in the future, costing the manufacturer more money than necessary for the promotion.

Finally, none of the approaches track the long-term impact of a promotion's effect on brand equity for an individual's buying behavior over time. Some promotions, even if deemed a success by traditional short-term measures, could have damaging long-term consequences. Increased price-based discounting, for example, can lead to consumers increasing the weight of price in determining their purchase decisions, making consumers more deal-prone and reluctant to buy at full price, leading to less loyalty to brands and retail outlets.

In view of the foregoing, there are desired improved methods and apparatuses for optimizing promotions in a manner that results in cost-effective, high-return, and timely promotions to the general public.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
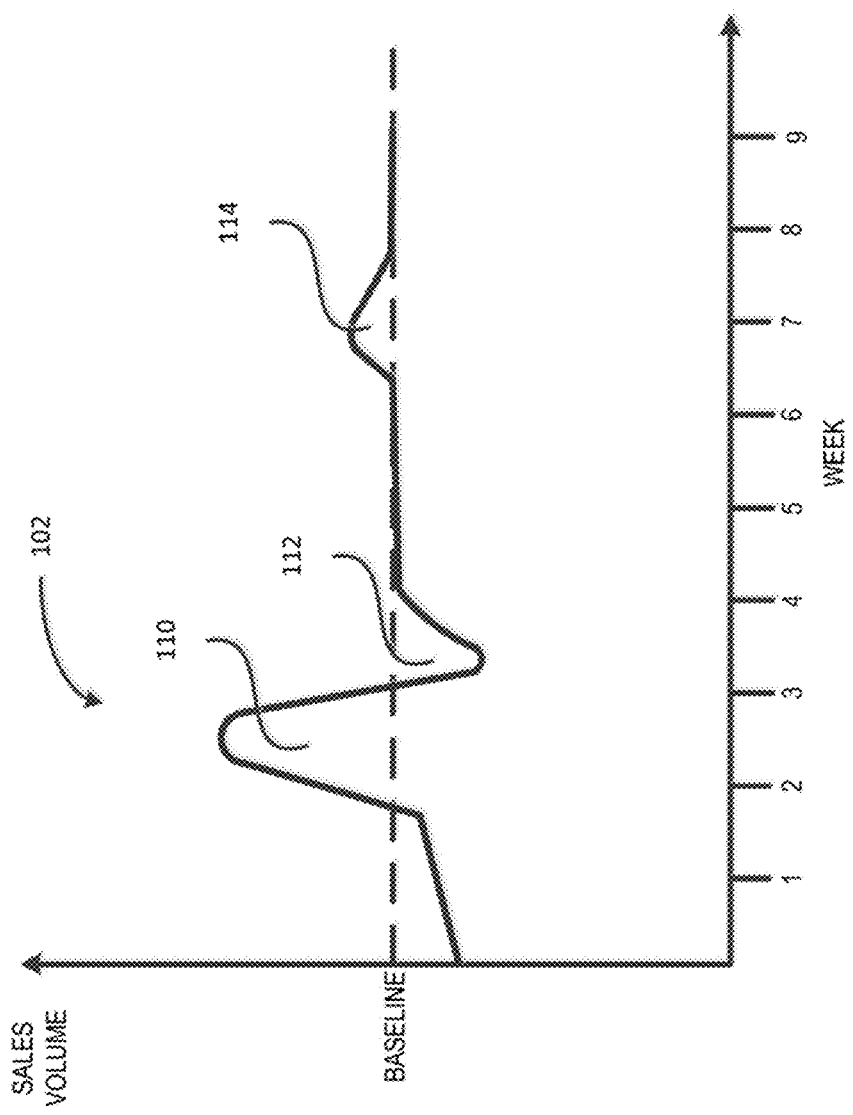
FIG. 1 shows an example demand curve 102 for Brand X cookies over some period of time.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include any of the data processing devices, including for example smart phones, tablet computers, laptop computers, or a general-purpose computers and/or dedicated computing devices when appropriately programmed and may include a combination of a computer/computing device and dedicated/programmable circuits adapted for the various tasks pertaining to embodiments of the invention. Such a data processing device include, as is well-known, at least a processor unit, a memory unit, a graphic processing unit, a data storage unit (such as a hard drive or semiconductor-based data storage device), one or more I/O circuits, one or more data communication sub-systems, and/or operating system/applications for executing executable code. Data processing devices are well-known and are not discussed in greater detail herein for brevity's sake. The apparatuses may be stand-alone or may be coupled together using a network, such as a local area network, an intranet, an internet, or a combination thereof.

One or more embodiments of the invention relate to methods and apparatus for optimizing promotions by administering, in large numbers and iteratively, test promotions on purposefully segmented subpopulations in advance of a general public promotion roll-out. In one or more embodiments, the inventive forward-looking promotion optimization (FL-PO) involves obtaining actual revealed preferences from individual consumers of the segmented subpopulations being tested.

The revealed preferences are obtained when the individual consumers respond to specifically designed actual test promotions. The revealed preferences are tracked in individual computer-implemented accounts (which may, for example, be implemented via a record in a centralized database and rendered accessible to the merchant or the consumer via a computer network such as the internet) associated with individual consumers. For example, when a consumer responds, using his smart phone or web browser, to a test promotion that offers 20% off a particular consumer packaged goods (CPG) item, that response is tracked in his individual computer-implemented account. Such computer-implemented accounts may be implemented via, for example, a loyalty card program, apps on a smart phone, computerized records accessible via a browser, social media news feed, etc.

In one or more embodiments, a plurality of test promotions may be designed and tested on a plurality of groups of consumers (the groups of consumers are referred to herein as "subpopulations"). The responses by the consumers are recorded and analyzed, with the analysis result employed to generate additional test promotions or to formulate the general population promotion.

As will be discussed later herein, if the consumer actually redeems the offer, one type of response is recorded and noted in the computer-implemented account of that consumer. Even if an action by the consumer does not involve actually redeeming or actually taking advantage of the promotional offer right away, an action by that consumer may, however, constitute a response that indicates a level of interest or lack of interest and may still be useful in revealing the consumer preference (or lack thereof). For example, if a consumer saves an electronic coupon (offered as part of a test promotion) in his electronic coupon folder or forwards that coupon to a friend via an email or a social website, that action may indicate a certain level of interest and may be useful in determining the effectiveness of a given test promotion. Different types of responses by the consumers may be accorded different weights, in one or more embodiments.

The groups of consumers involved in promotion testing represent segments of the public that have been purposefully segmented in accordance with segmenting criteria specifically designed for the purpose of testing the test promotions. As the term is employed herein, a subpopulation is deemed purposefully segmented when its members are selected based on criteria other than merely to make up a given number of members in the subpopulation. Demographics, buying behavior, behavioral economics are example criteria that may be employed to purposefully segment a population into subpopulations for promotion testing. In an example, a segmented population may number in the tens or hundreds or even thousands of individuals. In contrast, the general public may involve tens of thousands, hundreds of thousands, or millions of potential customers.

By purposefully segmenting the public into small subpopulations for promotion testing, embodiments of the invention can exert control over variables such as demographics (e.g., age, income, sex, marriage status, address, etc.), buying behavior (e.g., regular purchaser of Brand X cookies, consumer of premium food, frequent traveler, etc), weather, shopping habits, life style, and/or any other criteria suitable for use in creating the subpopulations. More importantly, the subpopulations are kept small such that multiple test promotions may be executed on different subpopulations, either simultaneously or at different times, without undue cost or delay in order to obtain data pertaining to the test promotion response behavior. The low cost/low delay aspect of creating and executing test promotions on purposefully segmented subpopulations permits, for example, what-if testing, testing in statistically significant numbers of tests, and/or iterative testing to isolate winning features in test promotions.

Generally speaking, each individual test promotion may be designed to test one or more test promotion variables. These test promotions variables may relate to, for example, the size, shape, color, manner of display, manner of discount, manner of publicizing, manner of dissemination pertaining to the goods/services being promoted.

As a very simple example, one test promotion may involve 12-oz packages of fancy-cut potato chips with medium salt and a discount of 30% off the regular price. This test promotion may be tested on a purposefully segmented subpopulation of 35-40 years old professionals in the $30,000-$50,000 annual income range. Another test promotion may involve the same 30% discount 12-oz packages of fancy-cut potato chips with medium salt on a different purposefully segmented subpopulation of 35-40 years old professionals in the higher $100,000-$150,000 annual income range. By controlling all variables except for income range, the responses of these two test promotions, if repeated in statistically significant numbers, would likely yield fairly accurate information regarding the relationship between income for 35-40 years old professionals and their actual preference for 12-oz packages of fancy cut potato chips with medium salt.

In designing different test promotions, one or more of the test promotions variables may vary or one or more of the segmenting criteria employed to create the purposefully segmented subpopulations may vary. The test promotion responses from individuals in the subpopulations are then collected and analyzed to ascertain which test promotion or test promotion variable(s) yields/yield the most desirable response (based on some predefined success criteria, for example).

Further, the test promotions can also reveal insights regarding which subpopulation performs the best or well with respect to test promotion responses. In this manner, test promotion response analysis provides insights not only regarding the relative performance of the test promotion and/or test promotion variable but also insights regarding population segmentation and/or segmentation criteria. In an embodiment, it is contemplated that the segments may be arbitrarily or randomly segmented into groups and test promotions may be executed against these arbitrarily segmented groups in order to obtain insights regarding personal characteristics that respond well to a particular type of promotion.

In an embodiment, the identified test promotion variable(s) that yield the most desirable responses may then be employed to formulate a general public promotion (GPP), which may then be offered to the larger public. A general public promotion is different from a test promotion in that a general public promotion is a promotion designed to be offered to members of the public to increase or maximize sales or profit whereas a test promotion is designed to be targeted to a small group of individuals fitting a specific segmentation criteria for the purpose of promotion testing. Examples of general public promotions include (but not limited to) advertisement printed in newspapers, release in public forums and websites, flyers for general distribution, announcement on radios or television, and/or promotion broadly transmitted or made available to members of the public. The general public promotion may take the form of a paper or electronic circular that offers the same promotion to the larger public, for example.

Alternatively or additionally, promotion testing may be iterated over and over with different subpopulations (segmented using the same or different segmenting criteria) and different test promotions (devised using the same or different combinations of test promotion variables) in order to validate one or more the test promotion response analysis result(s) prior to the formation of the generalized public promotion. In this manner, "false positives" may be reduced.

Since a test promotion may involve many test promotion variables, iterative test promotion testing, as mentioned, may help pin-point a variable (i.e., promotion feature) that yields the most desirable test promotion response to a particular subpopulation or to the general public.

Suppose, for example, that a manufacturer wishes to find out the most effective test promotion for packaged potato chips. One test promotion may reveal that consumers tend to buy a greater quantity of potato chips when packaged in brown paper bags versus green paper bags. That "winning" test promotion variable value (i.e., brown paper bag packaging) may be retested in another set of test promotions using different combinations of test promotion variables (such as for example with different prices, different display options, etc.) on the same or different purposefully segmented subpopulations. The follow-up test promotions may be iterated multiple times in different test promotion variable combinations and/or with different test subpopulations to validate that there is, for example, a significant consumer preference for brown paper bag packaging over other types of packaging for potato chips.

Further, individual "winning" test promotion variable values from different test promotions may be combined to enhance the efficacy of the general public promotion to be created. For example, if a 2-for-1 discount is found to be another winning variable value (e.g., consumers tend to buy a greater quantity of potato chips when offered a 2-for-1 discount), that winning test promotion variable value (e.g., the aforementioned 2-for-1 discount) of the winning test promotion variable (e.g., discount depth) may be combined with the brown paper packaging winning variable value to yield a promotion that involves discounting 2-for-1 potato chips in brown paper bag packaging.

The promotion involving discounting 2-for-1 potato chips in brown paper bag packaging may be tested further to validate the hypothesis that such a combination elicits a more desirable response than the response from test promotions using only brown paper bag packaging or from test promotions using only 2-for-1 discounts. As many of the "winning" test promotion variable values may be identified and combined in a single promotion as desired. At some point, a combination of "winning" test promotion variables (involving one, two, three, or more "winning" test promotion variables) may be employed to create the general public promotion, in one or more embodiments.

In one or more embodiments, test promotions may be executed iteratively and/or in a continual fashion on different purposefully segmented subpopulations using different combinations of test promotion variables to continue to obtain insights into consumer actual revealed preferences, even as those preferences change over time. Note that the consumer responses that are obtained from the test promotions are actual revealed preferences instead of stated preferences. In other words, the data obtained from the test promotions administered in accordance with embodiments of the invention pertains to what individual consumers actually do when presented with the actual promotions. The data is tracked and available for analysis and/or verification in individual computer-implemented accounts of individual consumers involved in the test promotions. This revealed preference approach is opposed to a stated preference approach, which stated preference data is obtained when the consumer states what he would hypothetically do in response to, for example, a hypothetically posed conjoint test question.

As such, the actual preference test promotion response data obtained in accordance with embodiments of the present invention is a more reliable indicator of what a general population member may be expected to behave when presented with the same or a similar promotion in a general public promotion. Accordingly, there is a closer relationship between the test promotion response behavior (obtained in response to the test promotions) and the general public response behavior when a general public promotion is generated based on such test promotion response data.

Also, the lower face validity of a stated preference test, even if the insights have statistical relevance, poses a practical challenge; CPG manufacturers who conduct such tests have to then communicate the insights to a retailer in order to drive real-world behavior, and convincing retailers of the validity of these tests after the fact can lead to lower credibility and lower adoption, or "signal loss" as the top concepts from these tests get re-interpreted by a third party, the retailer, who wasn't involved in the original test design.

It should be pointed out that embodiments of the inventive test promotion optimization methods and apparatuses disclosed herein operate on a forward-looking basis in that the plurality of test promotions are generated and tested on segmented subpopulations in advance of the formulation of a general public promotion. In other words, the analysis results from executing the plurality of test promotions on different purposefully segmented subpopulations are employed to generate future general public promotions. In this manner, data regarding the "expected" efficacy of the proposed general public promotion is obtained even before the proposed general public promotion is released to the public. This is one key driver in obtaining highly effective general public promotions at low cost.

Furthermore, the subpopulations can be generated with highly granular segmenting criteria, allowing for control of data noise that may arise due to a number of factors, some of which may be out of the control of the manufacturer or the merchant. This is in contrast to the aggregated data approach of the prior art.

For example, if two different test promotions are executed on two subpopulations shopping at the same merchant on the same date, variations in the response behavior due to time of day or traffic condition are essentially eliminated or substantially minimized in the results (since the time or day or traffic condition would affect the two subpopulations being tested in substantially the same way).

The test promotions themselves may be formulated to isolate specific test promotion variables (such as the aforementioned potato chip brown paper packaging or the 16-oz size packaging). This is also in contrast to the aggregated data approach of the prior art.

Accordingly, individual winning promotion variables may be isolated and combined to result in a more effective promotion campaign in one or more embodiments. Further, the test promotion response data may be analyzed to answer questions related to specific subpopulation attribute(s) or specific test promotion variable(s). With embodiments of the invention, it is now possible to answer, from the test subpopulation response data, questions such as "How deep of a discount is required to increase by 10% the volume of potato chip purchased by buyers who are 18-25 year-old male shopping on a Monday?" or to generate test promotions specifically designed to answer such a question. Such data granularity and analysis result would have been impossible to achieve using the backward-looking, aggregate historical data approach of the prior art.

In one or more embodiments, there is provided a promotional idea module for generating ideas for promotional concepts to test. The promotional idea generation module relies on a series of pre-constructed sentence structures that outline typical promotional constructs. For example, Buy X, get Y for $Z price would be one sentence structure, whereas Get Y for $Z when you buy X would be a second. It's important to differentiate that the consumer call to action in those two examples is materially different, and one cannot assume the promotional response will be the same when using one sentence structure vs. another. The solution is flexible and dynamic, so once X, Y, and Z are identified, multiple valid sentence structures can be tested. Additionally, other variables in the sentence could be changed, such as replacing "buy" with "hurry up and buy" or "act now" or "rush to your local store to find". The solution delivers a platform where multiple products, offers, and different ways of articulating such offers can be easily generated by a lay user. The amount of combinations to test can be infinite. Further, the generation may be automated, saving time and effort in generating promotional concepts.

In one or more embodiments, once a set of concepts is developed, the technology advantageously a) will constrain offers to only test "viable promotions", i.e., those that don't violate local laws, conflict with branding guidelines, lead to unprofitable concepts that wouldn't be practically relevant, can be executed on a retailers' system, etc., and/or b) link to the design of experiments for micro-testing to determine which combinations of variables to test at any given time.

In one or more embodiments, there is provided an offer selection module for enabling a non-technical audience to select viable offers for the purpose of planning traditional promotions (such as general population promotion, for example) outside the test environment. By using filters and advanced consumer-quality graphics, the offer selection module will be constrained to only show top performing concepts from the tests, with production-ready artwork wherever possible. By doing so, the offer selection module renders irrelevant the traditional, Excel-based or heavily numbers-oriented performance reports from traditional analytic tools. The user can have "freedom within a framework" by selecting any of the pre-scanned promotions for inclusion in an offer to the general public, but value is delivered to the retailer or manufacturer because the offers are constrained to only include the best performing concepts. Deviation from the top concepts can be accomplished, but only once the specific changes are run through the testing process and emerge in the offer selection windows.

In an embodiment, it is expressly contemplated that the general population and/or subpopulations may be chosen from social media site (e.g., Facebook™, Twitter™, Google+™, etc.) participants. Social media offers a large population of active participants and often provide various communication tools (e.g., email, chat, conversation streams, running posts, etc.) which makes it efficient to offer promotions and to receive responses to the promotions. Various tools and data sources exist to uncover characteristics of social media site members, which characteristics (e.g., age, sex, preferences, attitude about a particular topic, etc.) may be employed as highly granular segmentation criteria, thereby simplifying segmentation planning.

Although grocery stores and other brick-and-mortar businesses are discussed in various examples herein, it is expressly contemplated that embodiments of the invention apply also to online shopping and online advertising/promotion and online members/customers.

These and other features and advantages of embodiments of the invention may be better understood with reference to the figures and discussions that follow.

Figure 2A:
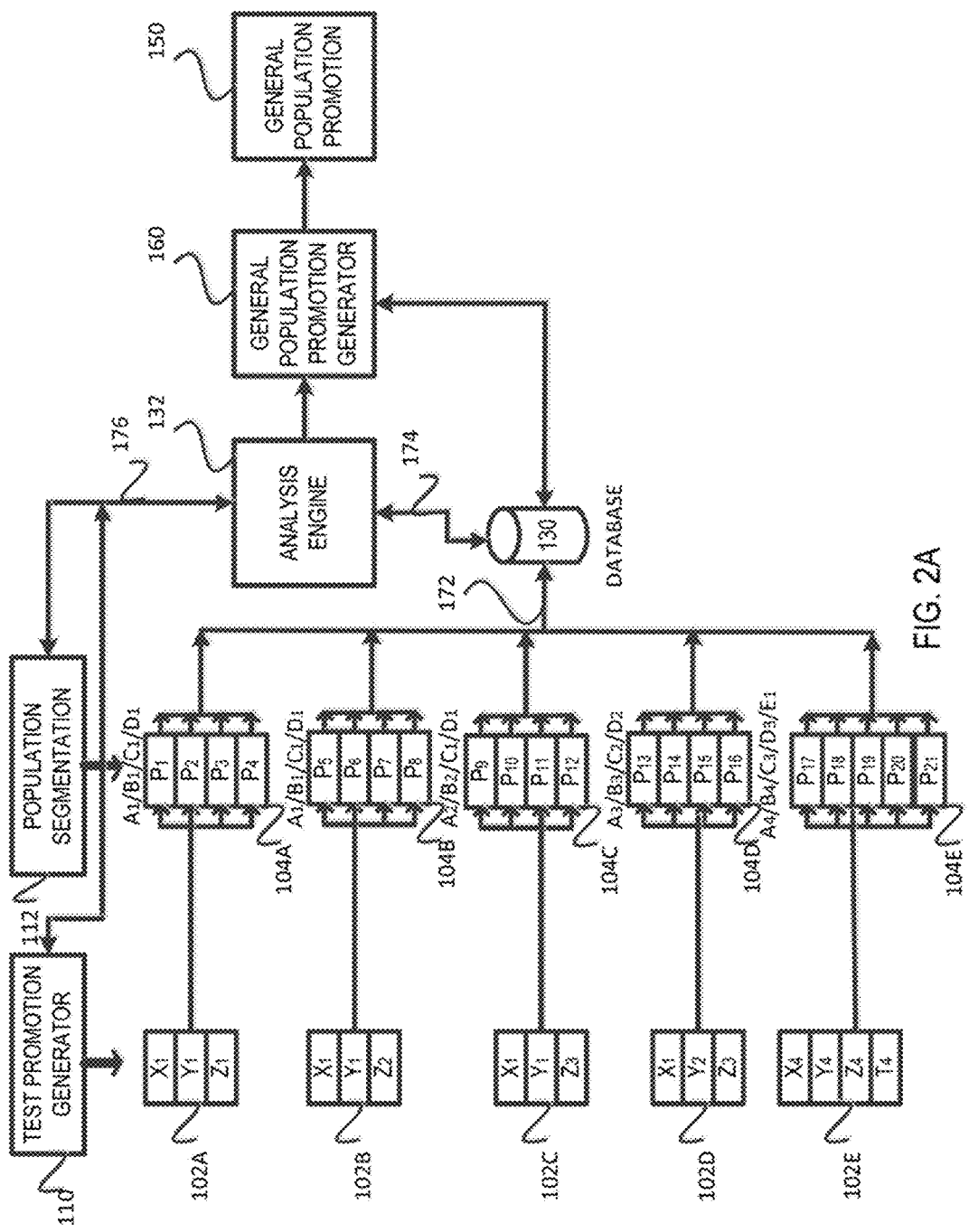
FIG. 2A shows, in accordance with an embodiment of the invention, a conceptual drawing of the forward-looking promotion optimization method.

FIG. 2A shows, in accordance with an embodiment of the invention, a conceptual drawing of the forward-looking promotion optimization method. As shown in FIG. 2A, a plurality of test promotions 102a, 102b, 102c, 102d, and 102e are administered to purposefully segmented subpopulations 104a, 104b, 104c, 104d, and 104e respectively. As mentioned, each of the test promotions (102a-102e) may be designed to test one or more test promotion variables.

In the example of FIG. 2A, test promotions 102a-102d are shown testing three test promotion variables X, Y, and Z, which may represent for example the size of the packaging (e.g., 12 oz versus 16 oz), the manner of display (e.g., at the end of the aisle versus on the shelf), and the discount (e.g., 10% off versus 2-for-1). These promotion variables are of course only illustrative and almost any variable involved in producing, packaging, displaying, promoting, discounting, etc. of the packaged product may be deemed a test promotion variable if there is an interest in determining how the consumer would respond to variations of one or more of the test promotion variables. Further, although only a few test promotion variables are shown in the example of FIG. 2A, a test promotion may involve as many or as few of the test promotion variables as desired. For example, test promotion 102e is shown testing four test promotion variables (X, Y, Z, and T).

One or more of the test promotion variables may vary from test promotion to test promotion. In the example of FIG. 2A, test promotion 102a involves test variable X1 (representing a given value or attribute for test variable X) while test promotion 102b involves test variable X2 (representing a different value or attribute for test variable X). A test promotion may vary, relative to another test promotion, one test promotion variable (as can be seen in the comparison between test promotions 102a and 102b) or many of the test promotion variables (as can be seen in the comparison between test promotions 102a and 102d). Also, there are no requirements that all test promotions must have the same number of test promotion variables (as can be seen in the comparison between test promotions 102a and 102e) although for the purpose of validating the effect of a single variable, it may be useful to keep the number and values of other variables (i.e., the control variables) relatively constant from test to test (as can be seen in the comparison between test promotions 102a and 102b).

Generally speaking, the test promotions may be generated using automated test promotion generation software 110, which varies for example the test promotion variables and/or the values of the test promotion variables and/or the number of the test promotion variables to come up with different test promotions.

In the example of FIG. 2A, purposefully segmented subpopulations 104a-104d are shown segmented using four segmentation criteria A, B, C, D, which may represent for example the age of the consumer, the household income, the zip code, and whether the person is known from past purchasing behavior to be a luxury item buyer or a value item buyer. These segmentation criteria are of course only illustrative and almost any demographics, behavioral, attitudinal, whether self-described, objective, interpolated from data sources (including past purchase or current purchase data), etc. may be used as segmentation criteria if there is an interest in determining how a particular subpopulation would likely respond to a test promotion. Further, although only a few segmentation criteria are shown in connection with subpopulations 104a-104d in the example of FIG. 2A, segmentation may involve as many or as few of the segmentation criteria as desired. For example, purposefully segmented subpopulation 104e is shown segmented using five segmentation criteria (A, B, C, D, and E).

In the present disclosure, a distinction is made between a purposefully segmented subpopulation and a randomly segmented subpopulation. The former denotes a conscious effort to group individuals based on one or more segmentation criteria or attributes. The latter denotes a random grouping for the purpose of forming a group irrespective of the attributes of the individuals. Randomly segmented subpopulations are useful in some cases; however they are distinguishable from purposefully segmented subpopulations when the differences are called out.

One or more of the segmentation criteria may vary from purposefully segmented subpopulation to purposefully segmented subpopulation. In the example of FIG. 2A, purposefully segmented subpopulation 104a involves segmentation criterion value A1 (representing a given attribute or range of attributes for segmentation criterion A) while purposefully segmented subpopulation 104c involves segmentation criterion value A2 (representing a different attribute or set of attributes for the same segmentation criterion A).

As can be seen, different purposefully segmented subpopulation may have different numbers of individuals. As an example, purposefully segmented subpopulation 104a has four individuals (P1-P4) whereas purposefully segmented subpopulation 104e has six individuals (P17-P22). A purposefully segmented subpopulation may differ from another purposefully segmented subpopulation in the value of a single segmentation criterion (as can be seen in the comparison between purposefully segmented subpopulation 104a and purposefully segmented subpopulation 104c wherein the attribute A changes from A1 to A2) or in the values of many segmentation criteria simultaneously (as can be seen in the comparison between purposefully segmented subpopulation 104a and purposefully segmented subpopulation 104d wherein the values for attributes A, B, C, and D are all different). Two purposefully segmented subpopulations may also be segmented identically (i.e., using the same segmentation criteria and the same values for those criteria) as can be seen in the comparison between purposefully segmented subpopulation 104a and purposefully segmented subpopulation 104b.

Also, there are no requirements that all purposefully segmented subpopulations must be segmented using the same number of segmentation criteria (as can be seen in the comparison between purposefully segmented subpopulation 104a and 104e wherein purposefully segmented subpopulation 104e is segmented using five criteria and purposefully segmented subpopulation 104a is segmented using only four criteria) although for the purpose of validating the effect of a single criterion, it may be useful to keep the number and values of other segmentation criteria (e.g., the control criteria) relatively constant from purposefully segmented subpopulation to purposefully segmented subpopulation.

Generally speaking, the purposefully segmented subpopulations may be generated using automated segmentation software 112, which varies for example the segmentation criteria and/or the values of the segmentation criteria and/or the number of the segmentation criteria to come up with different purposefully segmented subpopulations.

In one or more embodiments, the test promotions are administered to individual users in the purposefully segmented subpopulations in such a way that the responses of the individual users in that purposefully segmented subpopulation can be recorded for later analysis. As an example, an electronic coupon may be presented in an individual user's computer-implemented account (e.g., shopping account or loyalty account), or emailed or otherwise transmitted to the smart phone of the individual. In an example, the user may be provided with an electronic coupon on his smart phone that is redeemable at the merchant. In FIG. 2A, this administering is represented by the lines that extend from test promotion 102a to each of individuals P1-P4 in purposefully segmented subpopulation 104a. If the user (such as user P1) makes a promotion-significant response, the response is noted in database 130.

A promotion-significant response is defined as a response that is indicative of some level of interest or disinterest in the goods/service being promoted. In the aforementioned example, if the user P1 redeems the electronic coupon at the store, the redemption is strongly indicative of user P1's interest in the offered goods. However, responses falling short of actual redemption or actual purchase may still be significant for promotion analysis purposes. For example, if the user saves the electronic coupon in his electronic coupon folder on his smart phone, such action may be deemed to indicate a certain level of interest in the promoted goods. As another example, if the user forwards the electronic coupon to his friend or to a social network site, such forwarding may also be deemed to indicate another level of interest in the promoted goods. As another example, if the user quickly moves the coupon to trash, this action may also indicate a level of strong disinterest in the promoted goods. In one or more embodiments, weights may be accorded to various user responses to reflect the level of interest/disinterest associated with the user's responses to a test promotion. For example, actual redemption may be given a weight of 1, whereas saving to an electronic folder would be given a weight of only 0.6 and whereas an immediate deletion of the electronic coupon would be given a weight of –0.5.

Analysis engine 132 represents a software engine for analyzing the consumer responses to the test promotions. Response analysis may employ any analysis technique (including statistical analysis) that may reveal the type and degree of correlation between test promotion variables, subpopulation attributes, and promotion responses. Analysis engine 132 may, for example, ascertain that a certain test promotion variable value (such as 2-for-1 discount) may be more effective than another test promotion variable (such as 25% off) for 32-oz soft drinks if presented as an electronic coupon right before Monday Night Football. Such correlation may be employed to formulate a general population promotion (150) by a general promotion generator software (160). As can be appreciated from this discussion sequence, the optimization is a forward-looking optimization in that the results from test promotions administered in advance to purposefully segmented subpopulations are employed to generate a general promotion to be released to the public at a later date.

In one or more embodiments, the correlations ascertained by analysis engine 132 may be employed to generate additional test promotions (arrows 172, 174, and 176) to administer to the same or a different set of purposefully segmented subpopulations. The iterative testing may be employed to verify the consistency and/or strength of a correlation (by administering the same test promotion to a different purposefully segmented subpopulation or by combining the "winning" test promotion value with other test promotion variables and administering the re-formulated test promotion to the same or a different set of purposefully segmented subpopulations).

In one or more embodiments, a "winning" test promotion value (e.g., 20% off listed price) from one test promotion may be combined with another "winning" test promotion value (e.g., packaged in plain brown paper bags) from another test promotion to generate yet another test promotion. The test promotion that is formed from multiple "winning" test promotion values may be administered to different purposefully segmented subpopulations to ascertain if such combination would elicit even more desirable responses from the test subjects.

Since the purposefully segmented subpopulations are small and may be segmented with highly granular segmentation criteria, a large number of test promotions may be generated (also with highly granular test promotion variables) and a large number of combinations of test promotions/purposefully segmented subpopulations can be executed quickly and at a relatively low cost. The same number of promotions offered as general public promotions would have been prohibitively expensive to implement, and the large number of failed public promotions would have been costly for the manufacturers/retailers. In contrast, if a test promotion fails, the fact that the test promotion was offered to only a small number of consumers in one or more segmented subpopulations would limit the cost of failure. Thus, even if a large number of these test promotions "fail" to elicit the desired responses, the cost of conducting these small test promotions would still be quite small.

In an embodiment, it is envisioned that dozens, hundreds, or even thousands of these test promotions may be administered concurrently or staggered in time to the dozens, hundreds or thousands of segmented subpopulations. Further, the large number of test promotions executed (or iteratively executed) improves the statistical validity of the correlations ascertained by analysis engine. This is because the number of variations in test promotion variable values, subpopulation attributes, etc. can be large, thus yielding rich and granulated result data. The data-rich results enable the analysis engine to generate highly granular correlations between test promotion variables, subpopulation attributes, and type/degree of responses, as well as track changes over time. In turn, these more accurate/granular correlations help improve the probability that a general public promotion created from these correlations would likely elicit the desired response from the general public. It would also, over, time, create promotional profiles for specific categories, brands, retailers, and individual shoppers where, e.g., shopper 1 prefers contests and shopper 2 prefers instant financial savings.

Figure 2B:
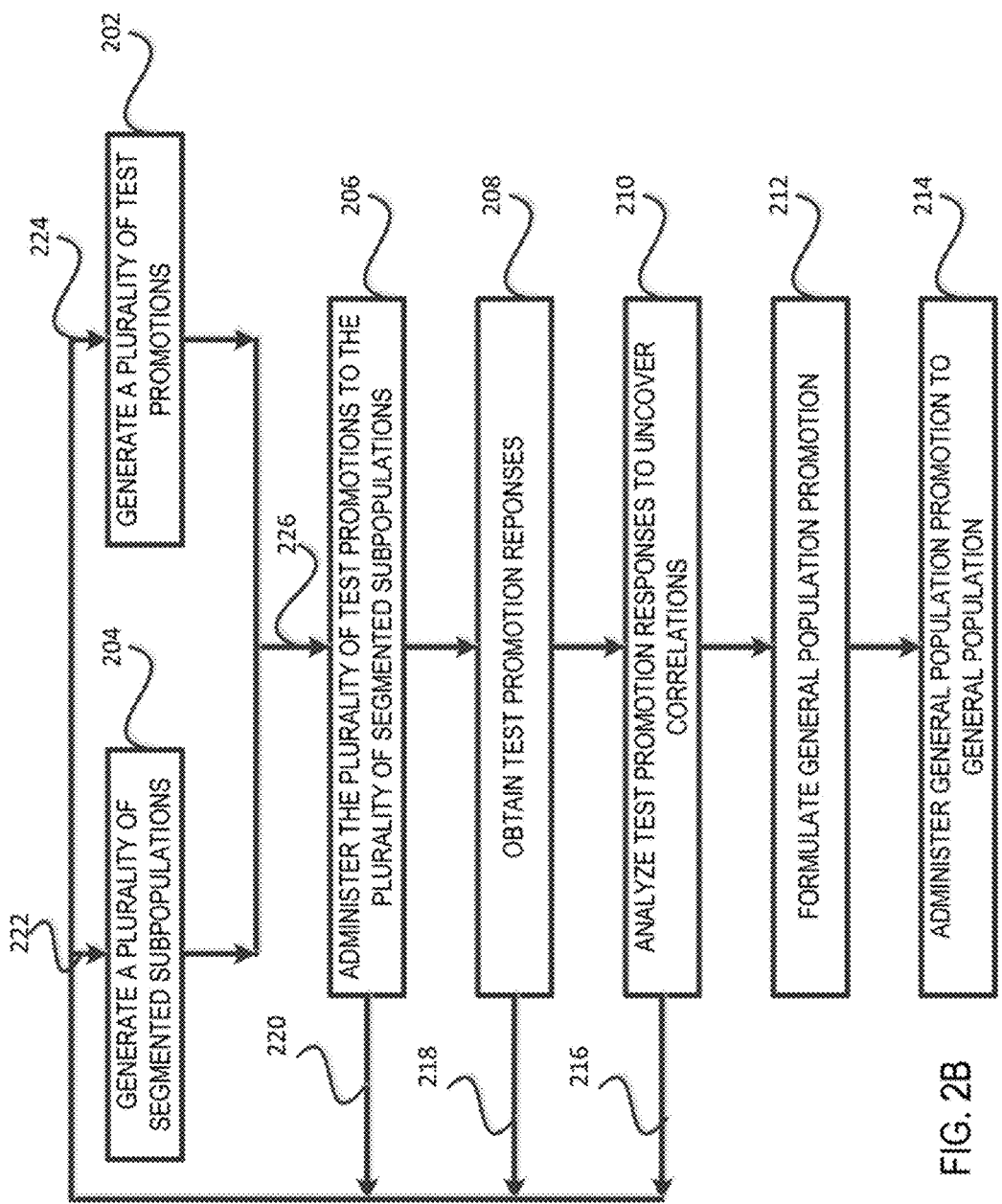
FIG. 2B shows, in accordance with an embodiment of the invention, the steps for generating a general public promotion.

FIG. 2B shows, in accordance with an embodiment of the invention, the steps for generating a general public promotion. In one or more embodiments, each, some, or all the steps of FIG. 2B may be automated via software to automate the forward-looking promotion optimization process. In step 202, the plurality of test promotions are generated. These test promotions have been discussed in connection with test promotions 102a-102e of FIG. 2A and represent the plurality of actual promotions administered to small purposefully segmented subpopulations to allow the analysis engine to uncover highly accurate/granular correlations between test promotion variables, subpopulation attributes, and type/degree of responses in an embodiment, these test promotions may be generated using automated test promotion generation software that varies one or more of the test promotion variables, either randomly, according to heuristics, and/or responsive to hypotheses regarding correlations from analysis engine 132 for example.

In step 204, the segmented subpopulations are generated. In an embodiment, the segmented subpopulations represent randomly segmented subpopulations. In another embodiment, the segmented subpopulations represent purposefully segmented subpopulations. In another embodiment, the segmented subpopulations may represent a combination of randomly segmented subpopulations and purposefully segmented subpopulations. In an embodiment, these segmented subpopulations may be generated using automated subpopulation segmentation software that varies one or more of the segmentation criteria, either randomly, according to heuristics, and/or responsive to hypotheses regarding correlations from analysis engine 132, for example.

In step 206, the plurality of test promotions generated in step 202 are administered to the plurality of segmented subpopulations generated in step 204. In an embodiment, the test promotions are administered to individuals within the segmented subpopulation and the individual responses are obtained and recorded in a database (step 208).

In an embodiment, automated test promotion software automatically administers the test promotions to the segmented subpopulations using electronic contact data that may be obtained in advance from, for example, social media sites, a loyalty card program, previous contact with individual consumers, or potential consumer data purchased from a third party, etc. The responses may be obtained at the point of sale terminal, or via a website or program, via social media, or via an app implemented on smart phones used by the individuals, for example.

In step 210, the responses are analyzed to uncover correlations between test promotion variables, subpopulation attributes, and type/degree of responses.

In step 212, the general public promotion is formulated from the correlation data, which is uncovered by the analysis engine from data obtained via subpopulation test promotions. In an embodiment, the general public promotion may be generated automatically using public promotion generation software which utilizes at least the test promotion variables and/or subpopulation segmentation criteria and/or test subject responses and/or the analysis provided by analysis engine 132.

In step 214, the general public promotion is released to the general public to promote the goods/services.

In one or more embodiments, promotion testing using the test promotions on the segmented subpopulations occurs in parallel to the release of a general public promotion and may continue in a continual fashion to validate correlation hypotheses and/or to derive new general public promotions based on the same or different analysis results. If iterative promotion testing involving correlation hypotheses uncovered by analysis engine 132 is desired, the same test promotions or new test promotions may be generated and executed against the same segmented subpopulations or different segmented subpopulations as needed (paths 216/222/226 or 216/224/226 or 216/222/224/226). As mentioned, iterative promotion testing may validate the correlation hypotheses, serve to eliminate "false positives" and/or uncover combinations of test promotion variables that may elicit even more favorable or different responses from the test subjects.

Promotion testing may be performed on an on-going basis using the same or different sets of test promotions on the same or different sets of segmented subpopulations as mentioned (paths 218/222/226 or 218/224/226 or 218/222/224/226 or 220/222/226 or 220/224/226 or 220/222/224/226).

Figure 3A:
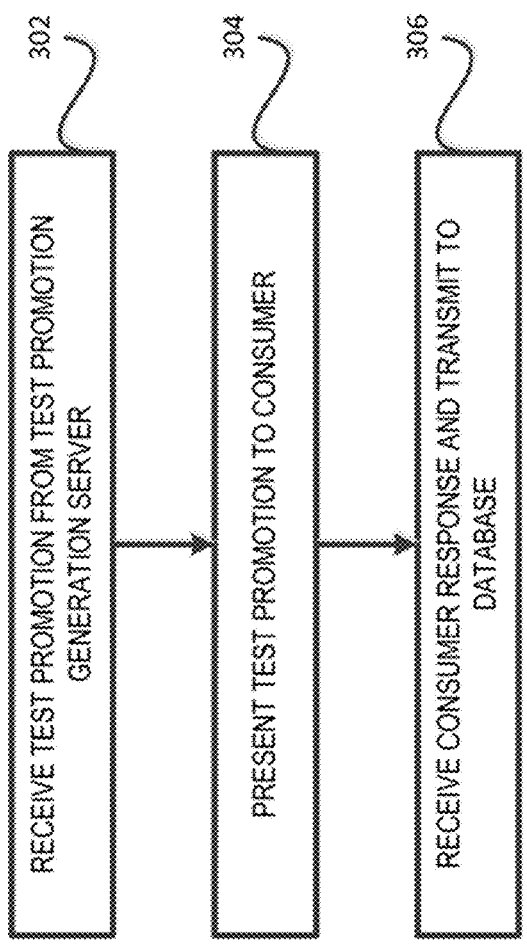
FIG. 3A shows in greater detail, in accordance with an embodiment of the invention, the administering step 206 of FIG. 2 from the user's perspective.

FIG. 3A shows in greater detail, in accordance with an embodiment of the invention, the administering step 206 of FIG. 2 from the user's perspective. In step 302, the test promotion is received from the test promotion generation server (which executes the software employed to generate the test promotion). As examples, the test promotion may be received at a user's smart phone or tablet (such as in the case of an electronic coupon or a discount code, along with the associated promotional information pertaining to the product, place of sale, time of sale, etc.) or in a computer-implemented account (such as a loyalty program account) associated with the user that is a member of the segmented subpopulation to be tested or via one or more social media sites. In step 304, the test promotion is presented to the user. In step 306, the user's response to the test promotion is obtained and transmitted to a database for analysis.

Figure 3B:
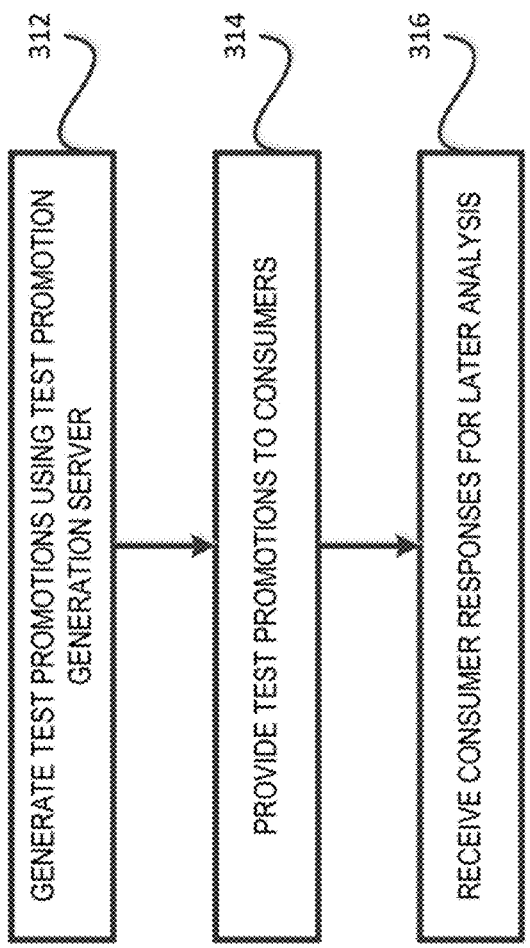
FIG. 3B shows in greater detail, in accordance with an embodiment of the invention, the administering step 206 of FIG. 2 from the forward-looking promotion optimization system perspective.

FIG. 3B shows in greater detail, in accordance with an embodiment of the invention, the administering step 206 of FIG. 2 from the forward-looking promotion optimization system perspective. In step 312, the test promotions are generated using the test promotion generation server (which executes the software employed to generate the test promotion). In step 314, the test promotions are provided to the users (e.g., transmitted or emailed to the user's smart phone or tablet or computer or shared with the user using the user's loyalty account). In step 316, the system receives the user's responses and stores the user's responses in the database for later analysis.

Figure 4:
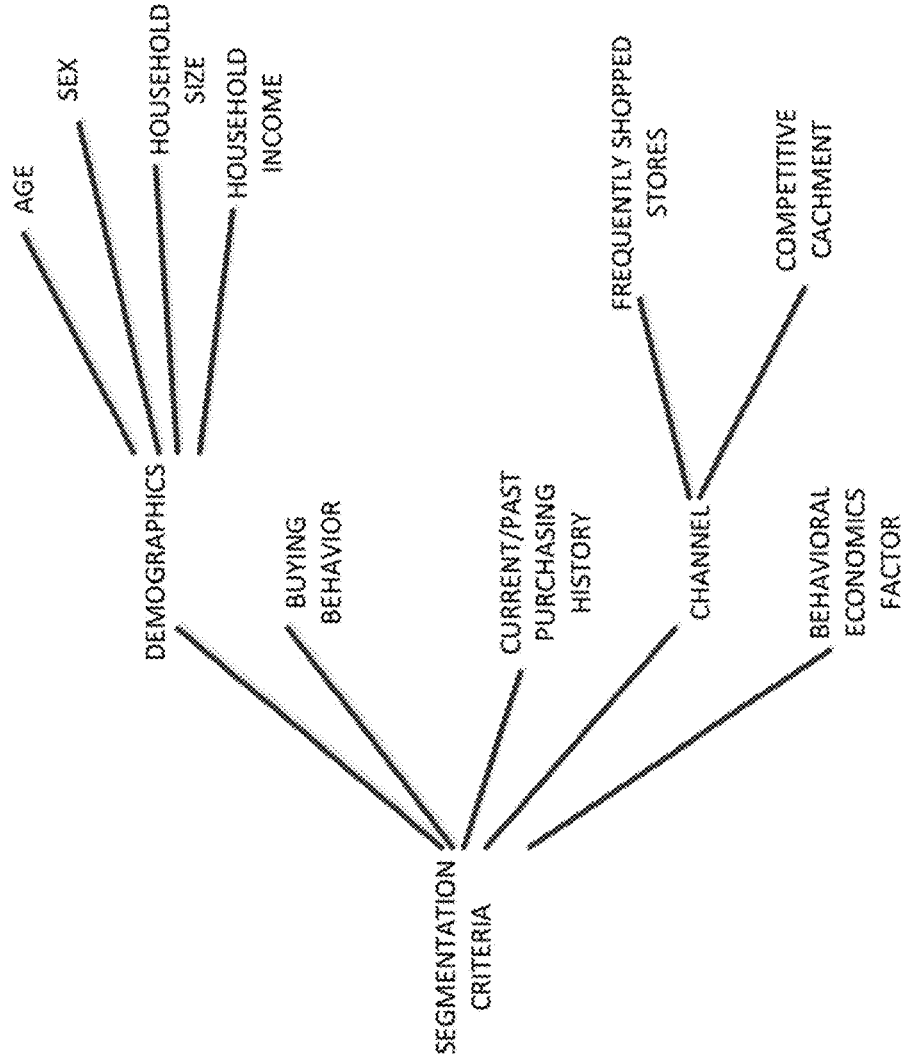
FIG. 4 shows various example segmentation criteria that may be employed to generate the purposefully segmented subpopulations.

FIG. 4 shows various example segmentation criteria that may be employed to generate the purposefully segmented subpopulations. As show in FIG. 4, demographics criteria (e.g., sex, location, household size, household income, etc.), buying behavior (category purchase index, most frequent shopping hours, value versus premium shopper, etc.), past/current purchase history, channel (e.g., stores frequently shopped at, competitive catchment of stores within driving distance), behavioral economics factors, etc. can all be used to generate with a high degree of granularity the segmented subpopulations. The examples of FIG. 4 are meant to be illustrative and not meant to be exhaustive or limiting. As mentioned, one or more embodiments of the invention generate the segmented subpopulations automatically using automated population segmentation software that generates the segmented subpopulations based on values of segmentation criteria.

Figure 5:
FIG. 5 shows various example methods for communicating the test promotions to individuals of the segmented subpopulations being tested.

FIG. 5 shows various example methods for communicating the test promotions to individuals of the segmented subpopulations being tested. As shown in FIG. 5, the test promotions may be mailed to the individuals, emailed in the form of text or electronic flyer or coupon or discount code, displayed on a webpage when the individual accesses his shopping or loyalty account via a computer or smart phone or tablet. Redemption may take place using, for example, a printed coupon (which may be mailed or may be printed from an electronic version of the coupon) at the point of sale terminal, an electronic version of the coupon (e.g., a screen image or QR code), the verbal providing or manual entry of a discount code into a terminal at the store or at the point of sale. The examples of FIG. 5 are meant to be illustrative and not meant to be exhaustive or limiting. One or more embodiments of the invention automatically communicate the test promotions to individuals in the segmented subpopulations using software that communicates/email/mail/administer the test promotions automatically. In this manner, subpopulation test promotions may be administered automatically, which gives manufacturers and retailers the ability to generate and administer a large number of test promotions with low cost/delay.

Figure 6:
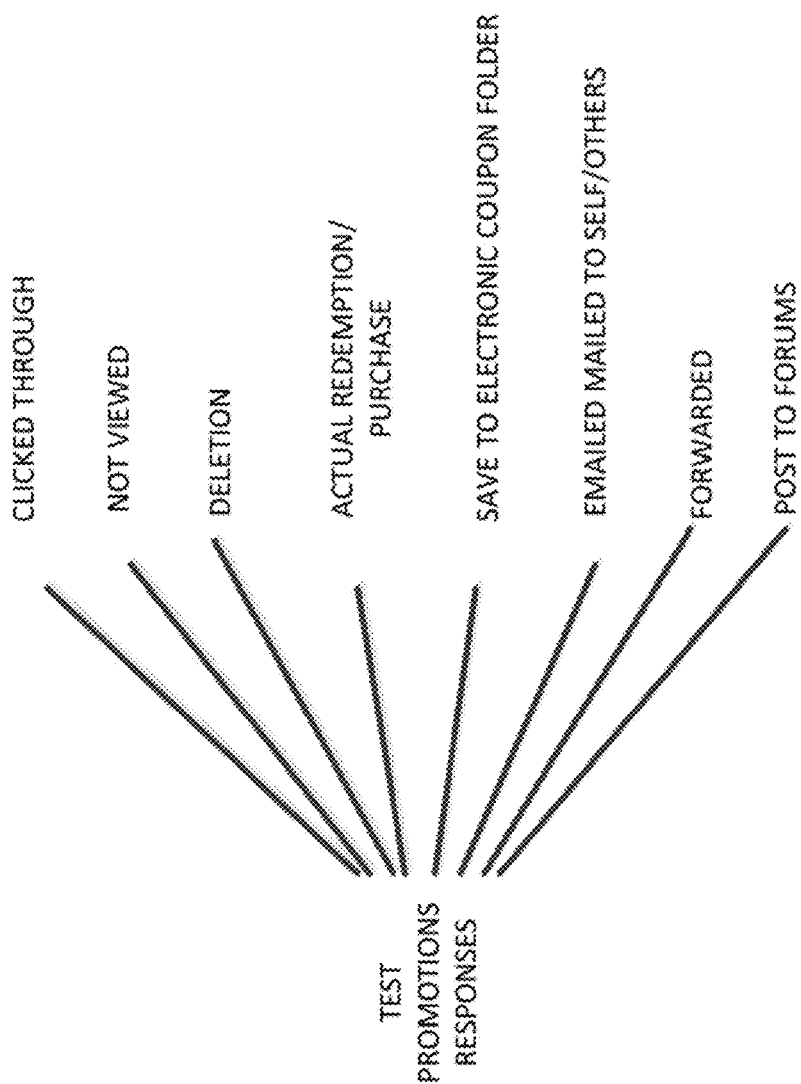
FIG. 6 shows, in accordance with an embodiment, various example promotion-significant responses.

FIG. 6 shows, in accordance with an embodiment, various example promotion-significant responses. As mentioned, redemption of the test offer is one strong indication of interest in the promotion. However, other consumer actions responsive to the receipt of a promotion may also reveal the level of interest/disinterest and may be employed by the analysis engine to ascertain which test promotion variable is likely or unlikely to elicit the desired response. Examples shown in FIG. 6 include redemption (strong interest), deletion of the promotion offer (low interest), save to electronic coupon folder (mild to strong interest), clicked to read further (mild interest), forwarding to self or others or social media sites (mild to strong interest). As mentioned, weights may be accorded to various consumer responses to allow the analysis engine to assign scores and provide user-interest data for use in formulating follow-up test promotions and/or in formulating the general public promotion. The examples of FIG. 6 are meant to be illustrative and not meant to be exhaustive or limiting.

Figure 7:
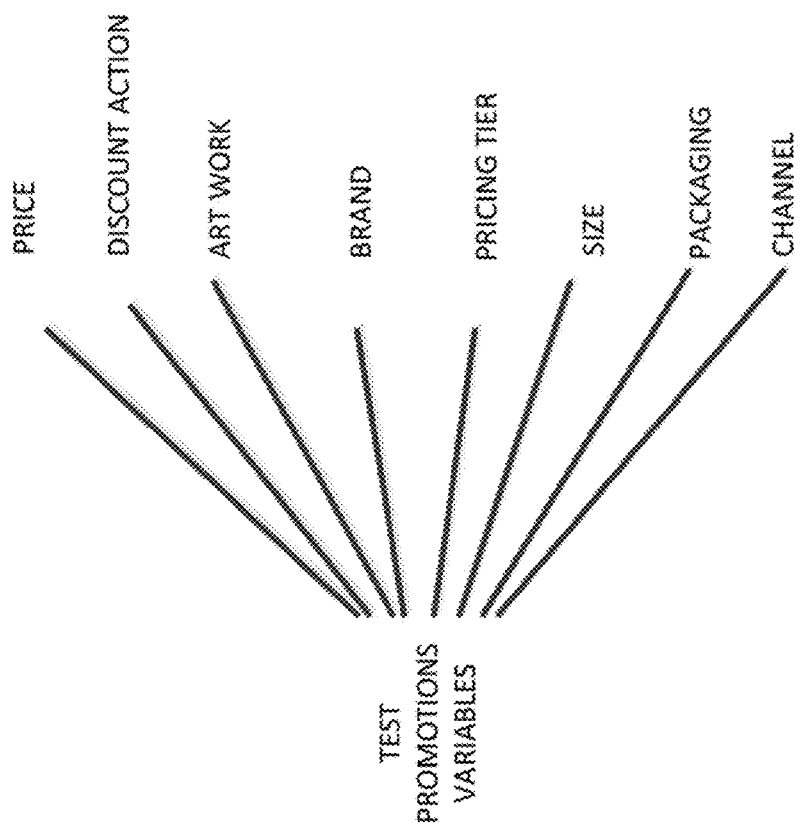
FIG. 7 shows, in accordance with an embodiment of the invention, various example test promotion variables affecting various aspects of a typical test promotion.

FIG. 7 shows, in accordance with an embodiment of the invention, various example test promotion variables affecting various aspects of a typical test promotion. As shown in FIG. 7, example test promotion variables include price, discount action (e.g., save 10%, save $1, 2-for-1 offer, etc.), artwork (e.g., the images used in the test promotion to draw interest), brand (e.g., brand X potato chips versus brand Y potato chips), pricing tier (e.g., premium, value, economy), size (e.g., 32 oz, 16 oz, 8 oz), packaging (e.g., single, 6-pack, 12-pack, paper, can, etc.), channel (e.g., email versus paper coupon versus notification in loyalty account). The examples of FIG. 7 are meant to be illustrative and not meant to be exhaustive or limiting. As mentioned, one or more embodiments of the invention involve generating the test promotions automatically using automated test promotion generation software by varying one or more of the test promotion variables, either randomly or based on feedback from the analysis of other test promotions or from the analysis of the general public promotion.

Figure 8:
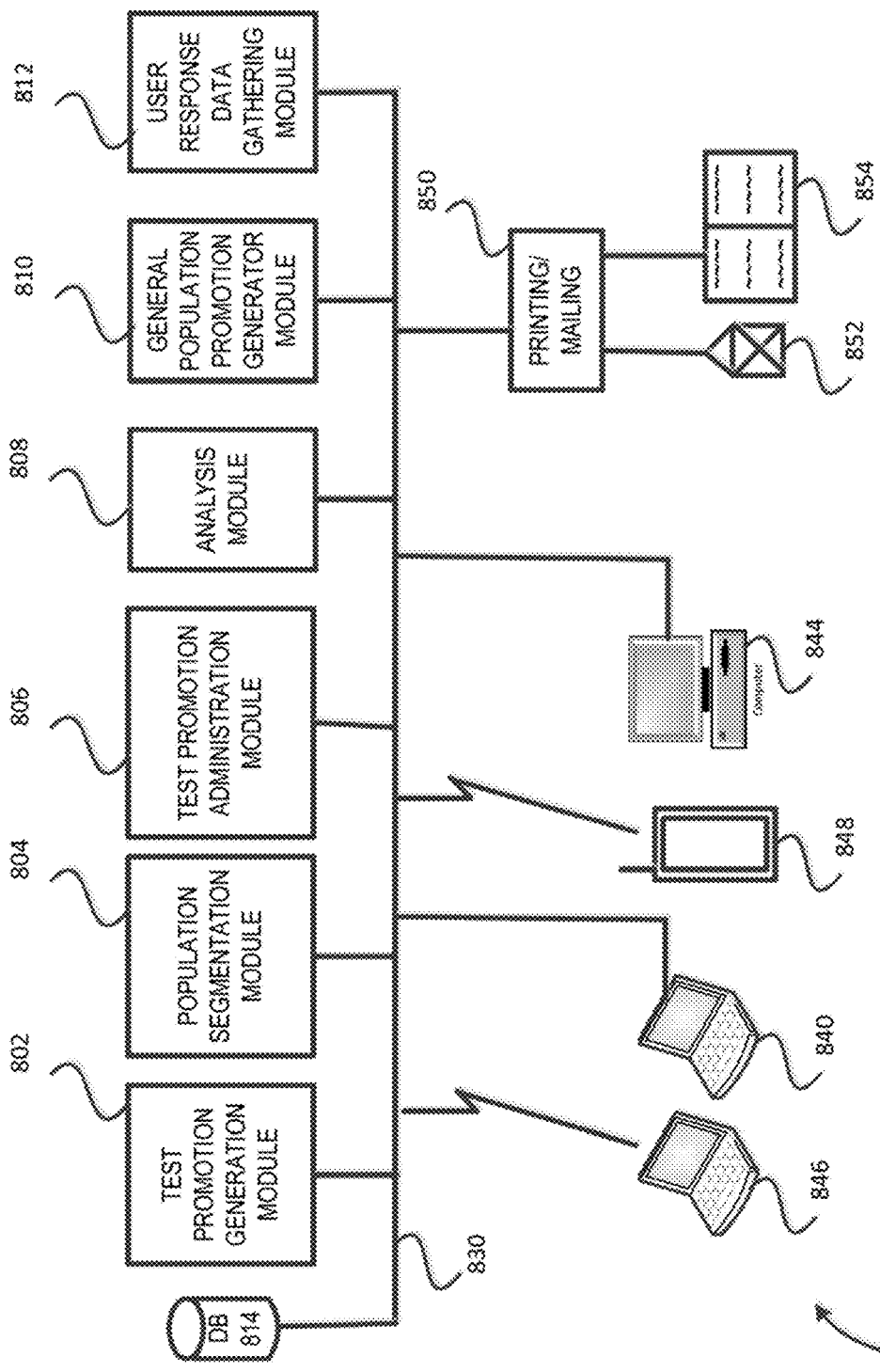
FIG. 8 shows, in accordance with an embodiment of the invention, a general hardware/network view of a forward-looking promotion optimization system.

FIG. 8 shows, in accordance with an embodiment of the invention, a general hardware/network view of the forward-looking promotion optimization system 800. In general, the various functions discussed may be implemented as software modules, which may be implemented in one or more servers (including actual and/or virtual servers). In FIG. 8, there is shown a test promotion generation module 802 for generating the test promotions in accordance with test promotion variables. There is also shown a population segmentation module 804 for generating the segmented subpopulations in accordance with segmentation criteria. There is also shown a test promotion administration module 806 for administering the plurality of test promotions to the plurality of segmented subpopulations. There is also shown an analysis module 808 for analyzing the responses to the test promotions as discussed earlier. There is also shown a general population promotion generation module 810 for generating the general population promotion using the analysis result of the data from the test promotions. There is also shown a module 812, representing the software/hardware module for receiving the responses. Module 812 may represent, for example, the point of sale terminal in a store, a shopping basket on an online shopping website, an app on a smart phone, a webpage displayed on a computer, a social media news feed, etc. where user responses can be received.

One or more of modules 802-812 may be implemented on one or more servers, as mentioned. A database 814 is shown, representing the data store for user data and/or test promotion and/or general public promotion data and/or response data. Database 814 may be implemented by a single database or by multiple databases. The servers and database(s) may be coupled together using a local area network, an intranet, the internet, or any combination thereof (shown by reference number 830).

User interaction for test promotion administration and/or acquiring user responses may take place via one or more of user interaction devices. Examples of such user interaction devices are wired laptop 840, wired computer 844, wireless laptop 846, wireless smart phone or tablet 848. Test promotions may also be administered via printing/mailing module 850, which communicates the test promotions to the users via mailings 852 or printed circular 854. The example components of FIG. 8 are only illustrative and are not meant to be limiting of the scope of the invention. The general public promotion, once generated, may also be communicated to the public using some or all of the user interaction devices/methods discussed herein.

Test promotion results are sometimes influenced by events that occur in the same time frame (but not necessarily has to be, although can be, at the same time) as the test promotion. For example, if a store has heavily discounted a given item for weeks, consumer demand for that item may have been temporarily sated for a while before the consumers who customarily shop at that store are ready to purchase that item again. If a test promotion for that item is executed in the time period immediately following the heavy discounting of that item by the store, it is likely that the decrease in enthusiasm in response to that test promotion may be due to the fact that the consumer has already stocked up on that item and not due to the design of the test promotion.

Promotions for products and/or services are often produced by marketers. For example, when a manufacturer has a product to promote, marketing and advertising personnel typically work together to create a promotion campaign to grab the consumer's attention and/or to provide an incentive (such as a certain percentage off coupon incentive) to spur the purchase of the product or service. The resulting promotion may be, for example, an electronic coupon for 5% off the purchase price of a particular quantity of the product, with the electronic coupon having specific action words (e.g., "buy now") and graphical elements and look-and-feel and provided on a specific channel (e.g., email, mobile, social media sites, etc.).

Up to now, this promotion creation process that results in a displayable promotion has relied almost exclusively on the experience and intuition of the promotion creators (e.g., the advertising and/or marketing personnel responsible for creating the promotion). Different promotion creators may have different proposals for the promotion (e.g., the aforementioned electronic coupon), since each carries with him or her deeply personal/professional experience and bias with various types of promotions. For example, some promotion creators may prefer a vibrant look, while others may prefer a more subdued look. As another example, some promotion creators may boldly state the action words as part of the layout (e.g., "Buy now"), while others may prefer a soft-sell approach.

If the proposed displayable promotion is approved by management personnel of the manufacturer, the promotion creator may then create the displayable promotion to be offered to the public via various channels, and data may be obtained during the promotion campaign to test the effectiveness of the displayable promotion employed. If that displayable promotion turns out to be ineffective, that displayable promotion may be suspended and another displayable promotion may be tried instead.

However, the promotion creation process of the prior art still involves human qualitative judgment and is thus prone to errors, especially if the human personnel involved are not skilled at designing a displayable promotion that would likely receive a positive response from the consumers.

Skilled human help is also expensive and difficult to find and is a limited resource, thereby representing a bottleneck in the promotion creation process.

Still further, since it is not known in advance how well the proposed displayable promotion would perform (e.g., in term of return-on-investment, in term of coupon redemption rate, or in term of improved sales volume), decision makers lack information to decide in an informed manner whether the proposed promotion campaign should be proceed.

What is desired is a more automated and systematic approach to promotion creation such that the proposed displayable promotion would have a higher likelihood of success based on provided criteria. What is also desired is an automatic and systematic approach to predicting the result of such proposed displayable promotion so that decision makers would have more information to decide, in an informed manner, regarding the merit of a proposed displayable promotion.

Figure 9:
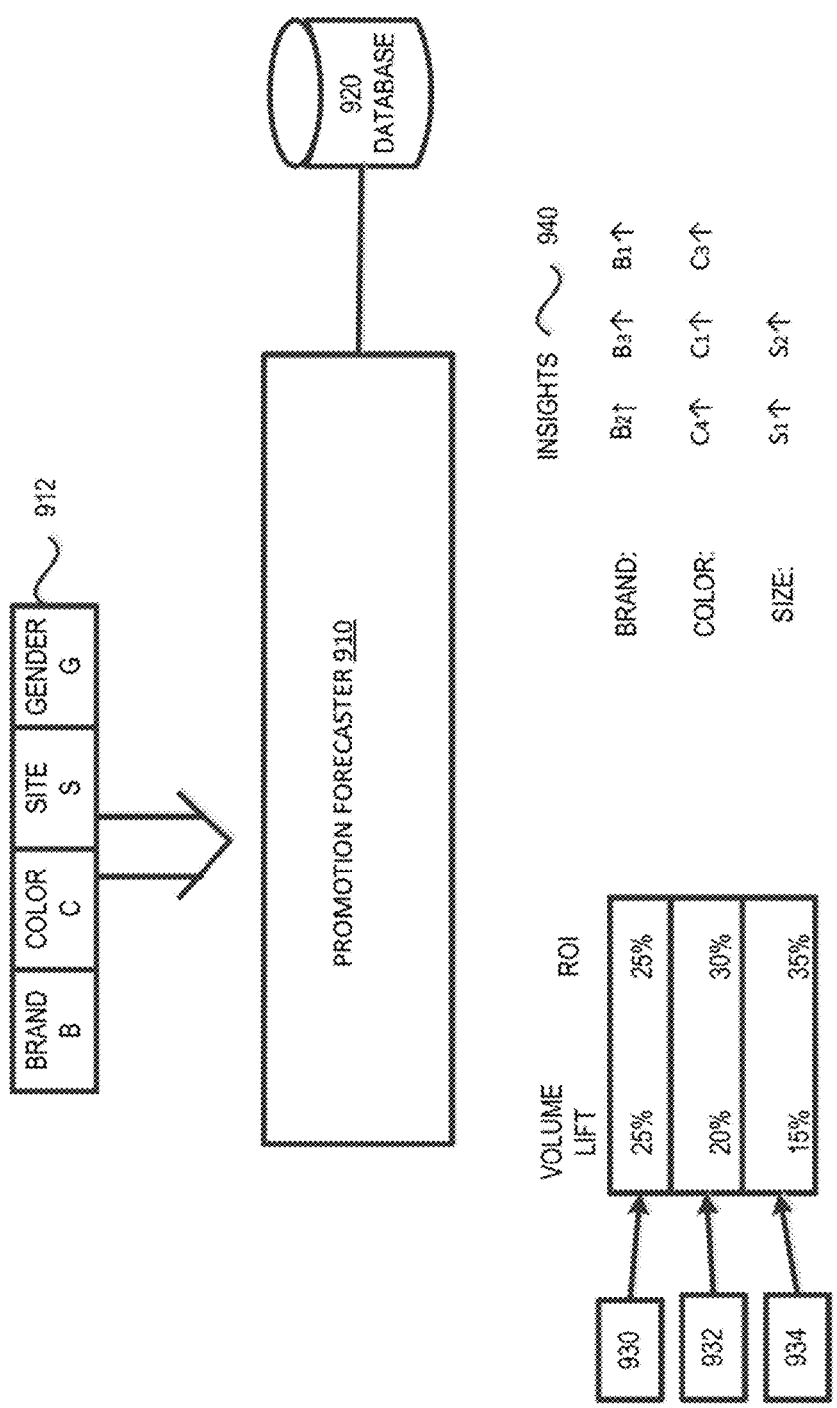
FIG. 9 shows, in accordance with an embodiment, a conceptual high-level view of the promotion forecaster.

FIG. 9 shows, in accordance with an embodiment, a conceptual high-level view of the promotion forecaster 910. Variable values 912 for the promotion concept are provided to promotion forecaster 910. For example, if the item to be promoted is a shirt, the variables may be brand, color, size, and gender (X, Y, Z, and G respectively). Each variable may have one or multiple values (as in the case the promoter has multiple shirts of different colors or brands to promote).

Other inputs to promotion forecaster 910 are also possible. An example input may represent the channels desired (e.g., how/where the consumer can access the promotion and may include channels such as social media sites, in-video placement such as the case with Youtube™ advertisements, emails, mobile browser, the consumer's own loyalty account, etc.). Another input may represent the criteria for selecting proposed promotions (e.g., whether to enhance sales volume, to enhance profitability, to increase awareness, etc.). Another input may be the types of promotion desired (e.g., % off, $ off, buy-one-get-one-free). In general, any number of criteria can be inputted into promotion forecaster 910 to more specifically indicate the type of promotions desired.

Promotion forecaster 910 works cooperatively with Experiment Knowledge Base (EKB) 920 and automatically produces proposed promotions 930, 932, and 934. These are displayable promotions designed to be executed on the channels desired for the item whose variable values 912 are entered into promotion forecaster 910.

"Automated" or "automatic" or "automatically" in the context of proposing promotions and predicting results denotes without required human intervention but does not require zero human intervention. The term however denotes that proposing promotions and predicting results in accordance with embodiments of the invention can be executed without human intervention if desired. However, embodiments of the invention do not exclude the optional participation of humans, especially experts, in various phases of process if such participation is optionally desired at various points to inject human intelligence or experience or timing or judgment into the process. Further, the term does not exclude the optional nonessential ancillary human activities that can otherwise also be automated (such as for example issuing the "run" command to begin the process or issuing the "send" command to send the proposed promotions onward).

As shown, each of proposed promotions 930, 932, and 934 may have a different format and may be of a different type. For example, proposed promotion 930 is of the "% off" variety; proposed promotion 932 is of the "$ off" variety, and proposed promotion 934 is of the "buy-one-get-one-free" variety. Although only 3 are shown, any number of proposed promotions may be presented In the case of FIG. 9, proposed promotions 930, 932, and 934 are ranked according to volume lift, which is the criteria for proposed promotion selection in this example. However, any other criteria may be specified, if desired. As can be seen, proposed promotion 930 results in a 25% increase in volume lift (e.g., increased sales volume) over the baseline promotion and a ROI (return on investment) of 25%. Proposed promotion 932 results in a 20% increase in volume lift over the baseline promotion and a ROI of 30%. Proposed promotion 934 results in a 15% increase in volume lift over the baseline promotion and a ROI of 35%. The financial data, which is outputted by promotion forecaster 910 and shown in FIG. 9, are only examples of the types of forecasted result that can be produced for each proposed promotion.

Insights 940 represent the explained rationale for the selection of the proposed promotions 930, 932, and 934. These insights are variable level insights and apply across multiple or all promotions. By isolating and analyzing the contribution from each variable value (e.g., B2 or C4) in past promotions, it is possible to ascertain that if a certain combination of variable values is chosen, positive responses due to the constituent variable values can be expected. Examples of such positive responses are shown as insights 940 in FIG. 9 with respect to variable values for brand, color, and size.

One of the reasons it is possible to, in an automated manner and with improved accuracy, forecast the promotions that would likely be successful, along with the projected financial result, is the use of experimental knowledge base 920. Although databases storing past promotions and their financial impact exist, experimental knowledge base 920 represents a database that collects and stores specific types of experimental promotion data that make it possible to automatically analyze and propose displayable promotions that would have a higher likelihood of success based on provided criteria as well as to predict the result of such proposed displayable promotions.

Figure 10:
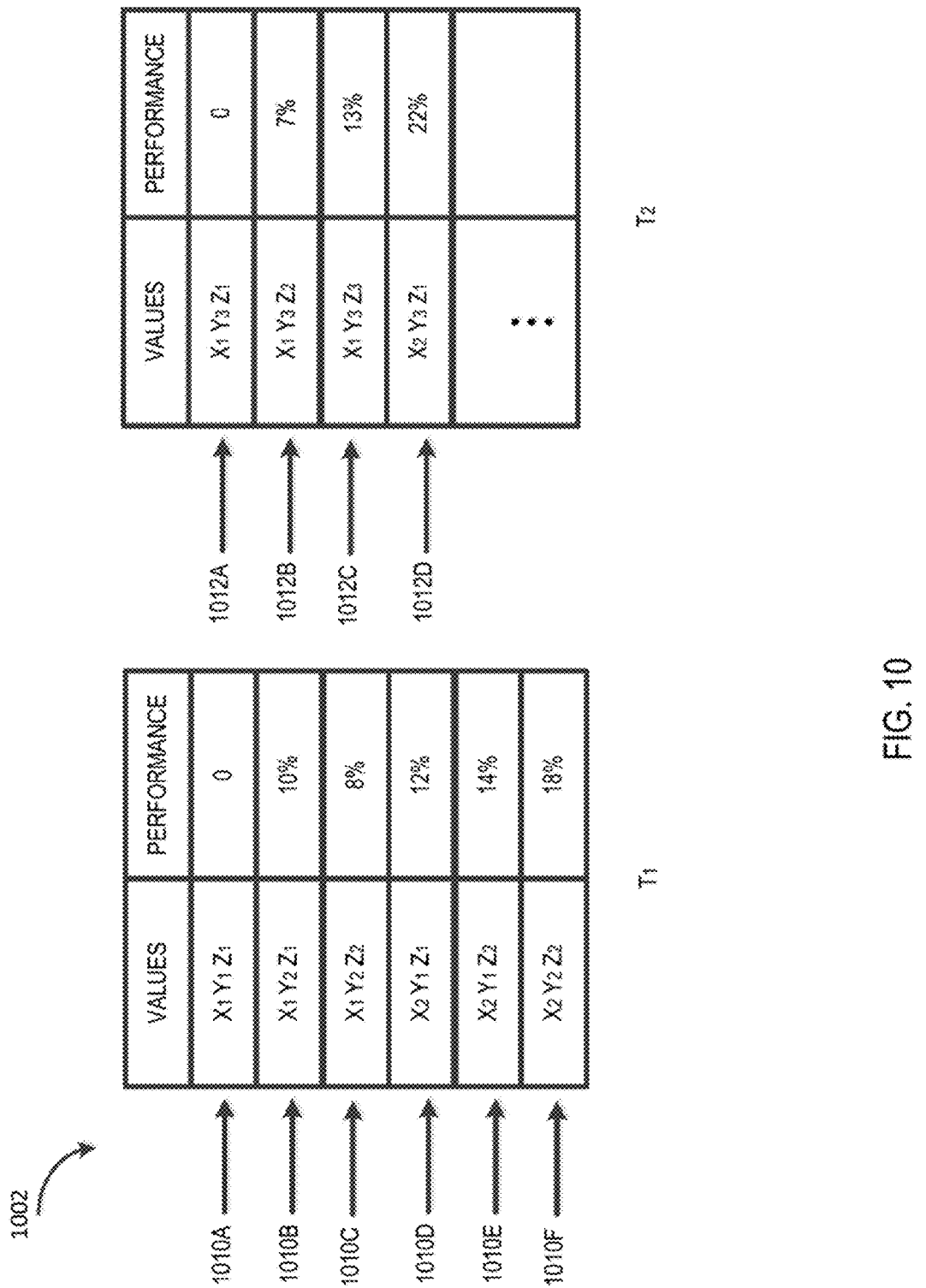
FIG. 10 shows an example experimental knowledge base.

FIG. 10 shows an example experimental knowledge base 1002. The illustration of FIG. 10 is intended to be conceptual and not reflective of the actual database table or data schema, which may vary depending on the database technology chosen and vendors. Experimental knowledge base 1002 stores not only past multivariate promotions 1010*a*, 1010*b*, 1010*c*, 1010*d*, 1010*e*, and 1010*f* but also their performance (e.g., financial performance or performance in accordance to any desired criteria).

More importantly, since this is a data store of experimental promotions that were conducted under controlled conditions (such as those automatically generated and administered to small groups of consumers to test promotions to obtain information for deriving the generalized public promotion), the baseline experiment information is also known and tracked. With respect to FIG. 10, promotions 1010*b*, 1010*c*, 1010*d*, 1010*e*, and 1010*f* employ different values for variables X, Y, and Z, and those combinations differ from those values employed in control baseline experiment 1010*a*. For example, promotion 1010*b* employs variable values X1, Y2, Z1 whereas control promotion 1010*a* employs variable values X1, Y1, Z1. The designation of the control experiment is typically done by the promotion designer of the experiment involving promotions 1010*a*, 1010*b*, 1010*c*, 1010*d*, 1010*e*, and 1010*f*.

Preferably, the control experiment 1010*a* and the variations (1010*b*-1010*f*) are executed at the same time period t1 to subject all these experimental promotions (1010*a* and 1010*b*-1010*f*) to the same testing environment during that time period. Alternatively or additionally, all these experimental promotions (1010*a* and 1010*b*-1010*f*) are preferably carried out in a manner so as to keep the testing environment (e.g., location, type of consumers, channels, etc.) as similar as possible. As such, external covariates that may affect the results (such as for example unemployment rate, weather, the existence of other promotions in competing stores, etc.) affect the promotion results similarly across promotions, thus tending to zero-out the contribution of the external covariates when the promotion results are compared against one another.

The existence of a database that stores the baseline experiment and variations of multivariate promotions that only vary the variable values but administered in substantially the same testing environment (i.e., same city, same neighborhood, same time period, etc.) or whose results can be adjusted to account for different testing environments provide the basis for the prediction tool in accordance with embodiments of the invention.

Without this baseline experiment information and without the existence of variations that only differ in variable values, and/or without the testing methodology that is designed to zero-out the covariates or can be the basis for computationally zeroing out the covariates with a reasonable degree of accuracy, it would have been impossible to accurately compare promotions to determine which promotion has better performance due only (or primarily) to a difference in variable values. Without this comparison, forecasting a proposed promotion based on past performance of other promotions would have been impossible. Further, without this baseline experiment information, it also would have been impossible to assess the performance of the various promotions and thus would have been impossible to forecast with any reasonable degree of accuracy the performance of a proposed promotion if one or more of the variable values in the variations is used for the proposed promotion.

Items 1012*a* shows another baseline experiment at time period t2, and items 1012*b*-1012*d* represent variations of the baseline experiment that test different combinations of variables X, Y, and Z. Item 1012*a* serves as the baseline experiment against which the performance of promotions 1012*b*-1012*d* can be measured.

Figure 11:
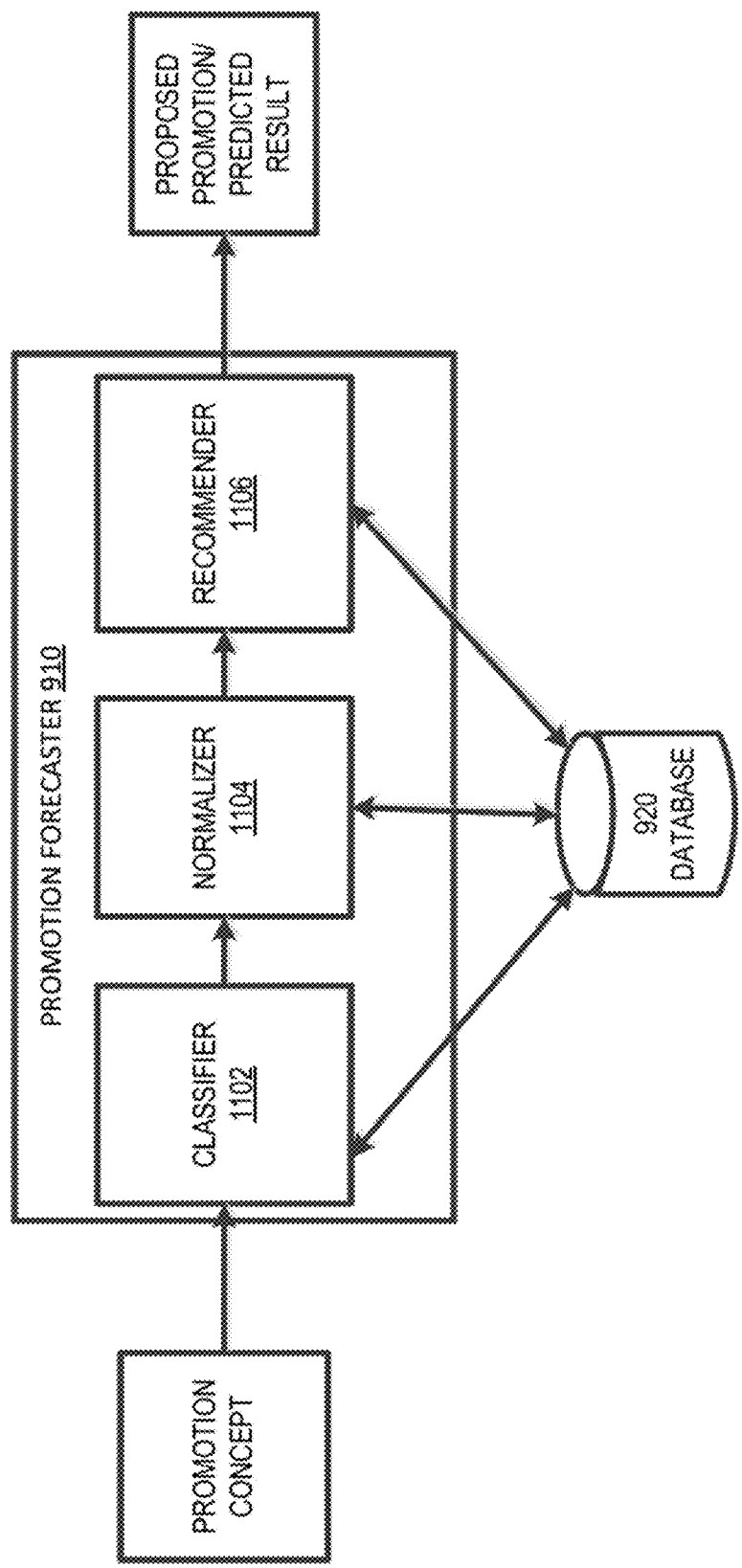
FIG. 11 shows, in accordance with an embodiment of the invention, the promotion forecaster of FIG. 9 in greater detail.

FIG. 11 shows, in accordance with an embodiment of the invention, promotion forecaster 910 of FIG. 9 in greater detail. Promotion forecaster 910 includes classifier 1102, representing the module for classifying the promotional concept received (e.g., the promotional concept represented by variable values inputted into promotion forecaster 910 in FIG. 9). The goal of classification is to assess the classifications of the variables associated with variable values for the promotional concept provided to promotion forecaster 910. In the context of the example of FIG. 9, information inputted may be classified into type of promotion (e.g., % discount versus $ off discount versus buy-one-get-one-free), the gender of the person in the image, the fact that the image is human or non-human, the format of the promotion, the channel of the promotion, etc.

Classification may also be done in accordance with behavioral economic principle. An example of a behavioral economic principle may be found in Daniel Kahneman's well-known work in codifying a number of heuristics or principles describing types of human behavior as a response to economic, psychological and social situations. An example would be people's tendency to be impressed by large numbers within an advertisement or promotion. "Over 50 Million served daily" or "Join the already 20 Million of subscribers today!" All of these contain large numbers to impress the consumer into being persuading or influenced. Such a human response follows the Numerosity principle.

Other classifications may also be possible, depending on for example the industry involved and type of merchandise. In an embodiment, classification may be learned—that is machine learning can be applied to the promotion variables of promotions stored in the database in order to for example automatically cluster or learn common attributes from which classifications can be generated. Since the classification labels are almost unlimited depending on for example, industry, goal, type of product or service, etc., it should be understood that generally speaking, classification abstracts the variables and creates a higher level of abstraction for comparison purposes. Comparison will be discussed later herein.

After classification, the promotional concept may be normalized. Normalization may be necessary to obtain more abstract metrics to enable comparison of promotions across different domains. For example, although the item to be promoted may be a teenage or young adult sweater, it is possible that successful promotions for adult men shirts in the past may have elements (i.e., variable values) which, if incorporated, may result in an increased likelihood of success for the proposed promotions for youth sweaters. As another example, although the item to be promoted may be an article of clothing, it is possible that successful promotions for cosmetics in the past may have elements that, if incorporated, may result in an increased likelihood of success for the proposed promotions for clothing.

In one or more embodiments, normalization further abstracts the attributes of the promotional concept into abstracts metrics that may be shared by past promotions stored in experimental knowledge base 920. Normalization may be thought of as standardization to a more abstract level so there would be a larger pool of promotions from which to pick the winning variable values or combination of variable values. Once normalized, past promotions sharing such abstract metrics may be examined such that variable values that performed the best (known since this is a database of multivariate experiments and their results) may be selected for use in the proposed promotion.

For example, promotion components (such as font, wording, font size) can be normalized across promotions into a higher abstraction to facilitate comparison. As another example, imagery may be normalized using, for example, well-developed techniques for describing or assigning attributes to images.

As a specific example, an image of a man wearing a sweater in a promotion concept for shoes (i.e., part of what is inputted into promotion forecaster 910) may be normalized or abstracted to "male gender" image to enable the comparison of the contributions by male gender images in promotions that contain the male gender image. If the image of a man walking a dog in a pharmaceutical promotion (i.e., a promotion in a different domain that contains the male gender image) was found in past experiments to be the variable value that contributes positively to the result of that test promotion, that image of a man walking a dog may be selected for use in the proposed promotion for shoes.

It should be noted that in this example, the abstraction level is "male gender" image although it is also possible to abstract higher to "human being present" image. The exact level of normalization may be tuned and may represent one of the control knobs for determining the size of the pool of past promotions from which the proposed promotions may be formulated.

A similar analysis may be made for the action word (e.g., "get") in the shoe promotion concept. Normalizing to "action word" may enable the comparison of the contributions made by other action words (e.g., "get", "grab", "buy", "acquire") in the promotions that contain the action words. If the action word "grab" in a carpet promotion (i.e., a promotion in a different domain that contains action words) was found in past experiments to be the variable value that contributes positively to the result of that test promotion, that action word "grab" may be selected for use in the proposed promotion for shoes.

Other variable values of the promotion concept inputted into promotion forecaster 910 may be similarly analyzed to arrive at the complete proposed promotion having the predicted optimal values for the promotion variables.

Prediction of result (including for example financial impact) of the proposed promotion is also possible. Normalization of product type, unit size, volume sold, cost of good may be made such that comparisons between past promotions are possible although they involve different product types, different unit sizes, different volumes sold, etc. As an example, weights may be assigned to a promotion for a product that sold in the millions of units such that the volume sold can be normalized and compared against a product that sold in the thousands of units. Once the volume sold is normalized, these two promotions may be compared to ascertain which has a higher return on investment, for example.

Once normalized, a predicted financial metrics (such as predicted percentage lift) can be found for a particular variable value of a particular past promotion (since the percentage lift for that promotion was recorded and analysis against the baseline promotion and other promotions of that multivariate experiment would yield the percentage lift contributed by a particular variable value). Accordingly, embodiments of the invention not only can suggest the variable values to use in the proposed promotion but also the predicted result. For the various variable values of the combination that make up the proposed promotion, the associated predicted results may be aggregated using some statistical or weighting techniques to arrive at the predicted result for the combination of proposed variable values in the proposed promotion.

It should be noted that one or more proposed promotions may be generated and may be ranked in accordance with some predefined criteria, if desired. In other words, given a certain criteria (e.g., increased sales volume), the steps of the invention may be iterated through to generate multiple different proposed promotions and to rank them in accordance with the furnished criteria, if desired.

In one or more embodiments, the same analysis may be employed to generate an experimental test plan to test variable values and combinations predicted to be likely to be successful. Thus in the context of the sweater example, the recommendation for font may be multiple high performing fonts, each of which has been found to be an important factor in the success of at least one experimental promotion in the past; the recommendation for graphics may be multiple high performing pictures, each of which has been found to be an important factor in the success of at least one experimental promotion in the past; the recommendation for background color may be multiple high performing background colors, each of which has been found to be an important factor in the success of at least one experimental promotion in the past.

These combinations form the pool of variable values for an automated promotion testing plan to explore various combinations of these variable values.

It should be noted that embodiments of the invention also enable predicting the result of a promotion if the user inputs a specific combination of variable values for the proposed promotion. In other words, in the case when the user knows exactly the promotion to be pushed to the consumers, the capability to predict result as discussed above may be used to predict the result of that specific proposed promotion, giving the decision makers data to decide whether to proceed with the promotion.

Recommender 1106 of FIG. 11 represents the module that obtains the variable values from previous promotions, each variable value representing a recommended component of the proposed promotion that would likely be successful. Recommender 1106 thus may recommend variable values B5, C3, S7, G=female for the proposed promotion for the example of FIG. 9 since each of values B5, C3, S7, and G9 was found to be high performing in past promotions (which may be different promotions from different domains). Machine modeling and/or machine learning may be employed for this analysis, in one or more embodiments.

Further, recommender 1106 also provides the predicted result for each of variable values B5, C3, S7, G=female, based on result data of past promotions, and may provide an aggregate result for the proposed promotion that combines variable values B5, C3, S7, G=female. Again, machine modeling and/or machine learning may be employed for this analysis, in one or more embodiments.

Returning to FIG. 10, experimental knowledge base 1002 may include ongoing, updated, classified, and/or normalized experimental data on promotions. For example, classification data pertaining to prior promotion experiments may be kept by experimental knowledge base 1002. As another example, normalized data pertaining to prior promotion experiments may be kept by experimental knowledge base 1002.

As another example, metadata pertaining to prior promotion experiments may be kept by experimental knowledge base 1002. These metadata may include, for example and without limitation, the experimental conditions such as who conducted the experiments, where the experiments were tested, how much data was collected, what was the control baseline experiment, etc.

As another example, covariate data pertaining to prior promotion experiments may be kept by experimental knowledge base 1002. The covariate data may include, for example and without limitation, data regarding extraneous conditions that exist when the prior promotion experiments were conducted. Example covariates include data regarding whether the promotion was conducted during the holiday season, whether the weather was cold or warm, whether the promotion was conducted during valentine, the interest rate, the stock market index, prevailing consumer moods, etc.

As another example, promotion variable values pertaining to prior promotion experiments may be kept by experimental knowledge base 1002. These data items may include, for example, the variable values (e.g., font size, graphics, action words, type of discount, item involved) and/or other attributes of the prior test promotions.

As another example, promotion response data pertaining to prior promotion experiments may be kept by experimental knowledge base 1002. The promotion response data may include, for example and without limitation, the number of people who loaded the promotion, how many actually clicked on the promotion, how many actually redeemed, etc.

If a promotion stored in the experimental knowledge base has not actually been conducted, this promotion response data may be predicted data, in one or more embodiments.

As another example, result data pertaining to prior experimental promotions may be kept by experimental knowledge base 1002. The result data may include, for example and without limitation, the volume lift due to the promotion, the return on investment, etc. If a promotion stored in the experimental knowledge base has not actually been conducted, this result data may be predicted data, in one or more embodiments.

Other data items may also be kept by experimental knowledge base 1002. The important point is the database contains description and performance data of past multivariate experimental promotions that were conducted in a controlled manner. Further, there is also included information pertaining to the baseline experiment so that recommendations based on classified and/or normalized promotion concept data and past promotion data may be automatically generated. In one or more embodiments, data pertaining to the current promotional concept being investigated may also be updated into experimental knowledge base 1002 if desired.

Figure 12:
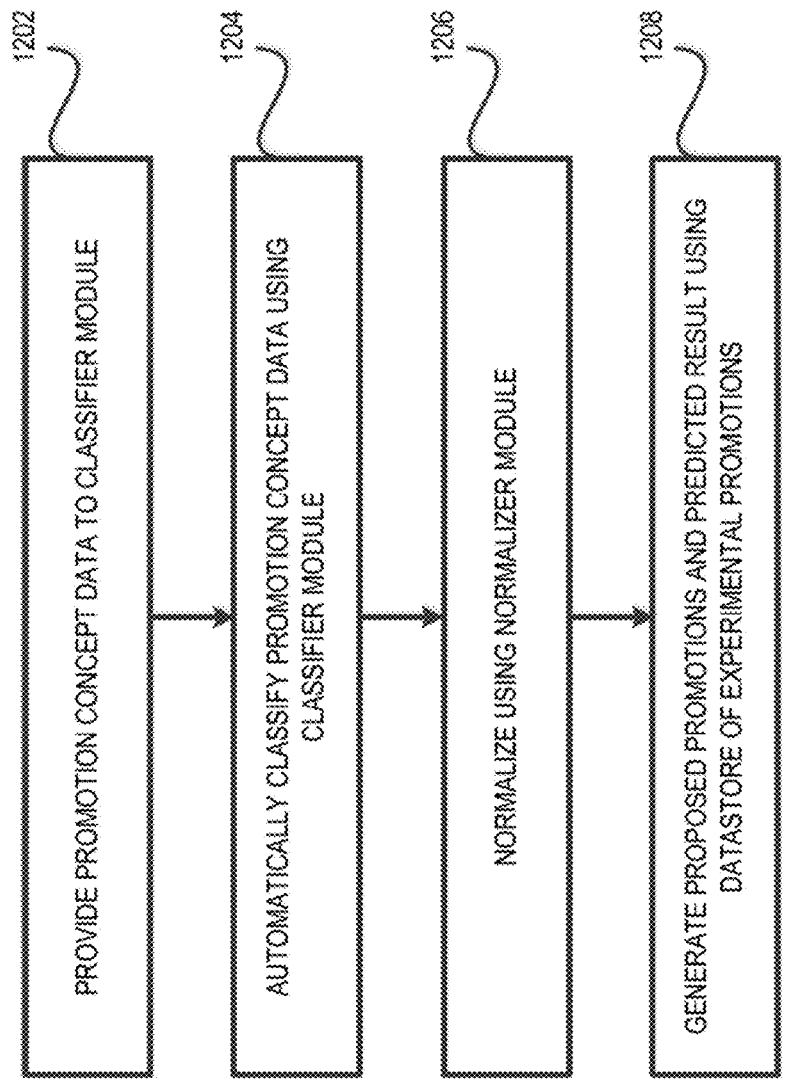
FIG. 12 shows, in accordance with an embodiment of the invention, the steps for generating, in an automated manner and with improved accuracy, a promotion that has an improved likelihood of success based on data obtained from past experimental promotions.

FIG. 12 shows, in accordance with an embodiment of the invention, the steps for generating, in an automated manner and with improved accuracy, a promotion that has an improved likelihood of success based on data obtained from past experimental promotions. In step 1202, promotion concept data (such as for example promotion variable values, channels, etc.) is provided to a classifier module of the promotion generator engine.

In step 1204, the classifier module of the promotion forecaster engine automatically classifies the promotion concept data into classifications.

In step 1206, the normalizer module of the promotion forecaster engine automatically normalizes the promotion concept data to enable comparisons with and among prior experimental promotions stored in the experimental knowledge database. As discussed in connection with FIG. 10, this experimental knowledge base having experimental data for multivariate promotion experiments that are collected in a controlled manner and having baseline experiment information holds an important key in enabling the robust and automated generation of proposed promotions.

In step 1208, one or more proposed promotions are automatically generated by the recommender module of the promotion forecaster engine. The proposed promotions are generated from analysis of the normalized promotion concept data and from previously stored experimental promotion data. Predicted result may also be provided in step 1208 if desired.

As can be appreciated from the foregoing, embodiments of the invention enable the automated and robust generation of proposed promotions based on promotion concept input and based on a database of previously collected multivariate experimental promotions that were conducted under controlled conditions. By classifying, normalizing, and then performing comparisons of past experimental promotions in the same domain and across domains, embodiments of the invention are able to automatically generate proposed promotions from variable values, each of which has proven to be successful in past promotions. Further, embodiments of the invention also extract and compute associated result data to present to human decision makers, enabling the human decision makers to decide whether a proposed promotion is worth pursuing in the marketplace.

While this invention has been described in terms of several preferred embodiments, there are alterations, permutations, and equivalents, which fall within the scope of this invention. The invention should be understood to also encompass these alterations, permutations, and equivalents. It should also be noted that there are many alternative ways of implementing the methods and apparatuses of the present invention. Although various examples are provided herein, it is intended that these examples be illustrative and not limiting with respect to the invention.

The invention claimed is:

1. A computer-implemented method for performing promotion optimization that is performed by a promotion optimization system, containing one or more processors, a promotion module, an administration module, and a monitoring module, the method, comprising:
   receiving a set of variable values for a product, a desired channel, and a criteria;
   accessing an experimental knowledge database of previous promotions, wherein the previous promotions have prior variable values and results on the criteria;
   clustering variables by promotional concept, wherein the promotional concepts include promotion type, presence of a person in a promotion image, gender of the person, promotion format, promotion channel, and numerosity behavioral economic principle using machine learned clustering algorithms;
   aggregating the promotional concepts into pools of a given size by shared attributes;
   calculating an impact each value of the set of variable values has on the criteria by comparison of the prior variable value to a baseline experiment information for the set of variable values, and the prior variable value's associated result, that is in the same pool as the each value of the set of variable values;
   generating a plurality of test promotions automatically for the channel;
   aggregating the impact of the values of each test promotion to generate a predicted result for each test promotion;
   ranking the plurality of test promotions by predicted result against the criteria;
   proposing a subset of the plurality of test promotions with the highest ranking to improve administration of the plurality of test promotions; and
   administering the proposed subset of test promotions in real-time wherein the real-time administration of test promotions includes concurrent testing of the plurality of test promotions at the same time to a plurality consumers, to improve selection of the variable values such that impactful values are tested.

2. The method of claim 1, wherein the desired channel includes social media sites, in-video placement, emails, mobile browser, and loyalty accounts.

3. The method of claim 1, wherein the criteria is one of increased volume, increased profitability, and increased customer awareness.

4. The method of claim 3, wherein the criteria may further include promotion type.

5. The method of claim 4, wherein the promotion types includes percent off, amount off, and buy one quantity get a second quantity free.

6. The method of claim 1, wherein insights are isolated effects of each variable value in the previous promotions to determine if a combination of variable values will result in a desired response.

7. The method of claim 6, wherein the previous promotions are stored in the experimental knowledge database of past multivariate promotions and their performance.

8. The method of claim 7, wherein the performance for each multivariate promotion is compared against a baseline experiment.

9. The method of claim 8, wherein the baseline experiment is tested in the same time period as experimental promotions.

10. The method of claim 1, wherein the classifying is by type of promotion, gender of the person in an image, existence of a human in the image, format of promotion, and channel of promotion.

11. The method of claim 10, wherein the classification uses behavioral economic principle.

12. The method of claim 1, further comprising determining a predicted percentage lift for a particular variable value of a past promotion.

13. The method of claim 12, further comprising aggregating and weighting the predicted percentage lift for each variable value to arrive at a predicted result for the test promotion.

14. The method of claim 1, wherein the given size of the pools is configurable by a user.

* * * * *